US009740326B2

(12) United States Patent
Shen et al.

(10) Patent No.: US 9,740,326 B2
(45) Date of Patent: *Aug. 22, 2017

(54) SENSOR ARRAY WITH SPLIT-DRIVE DIFFERENTIAL SENSING

(71) Applicant: Synaptics Incorporated, San Jose, CA (US)

(72) Inventors: Guozhong Shen, San Jose, CA (US); Ozan Ersan Erdogan, San Jose, CA (US); Taehee Cho, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/788,200

(22) Filed: Jun. 30, 2015

(65) Prior Publication Data

US 2016/0291766 A1   Oct. 6, 2016

Related U.S. Application Data

(63) Continuation-in-part of application No. 14/674,623, filed on Mar. 31, 2015.

(51) Int. Cl.
   *G01R 27/08*    (2006.01)
   *G06F 3/041*    (2006.01)
   (Continued)

(52) U.S. Cl.
   CPC ............ *G06F 3/0416* (2013.01); *G06F 3/044* (2013.01); *G06F 3/0418* (2013.01); *G06K 9/0002* (2013.01); *G06K 9/0008* (2013.01)

(58) Field of Classification Search
   CPC ........ G01D 5/24; G01D 5/241; G01D 5/2412; G01R 27/26; G01R 27/2605
   (Continued)

(56) References Cited

U.S. PATENT DOCUMENTS 3,793,632 A * 2/1974 Still ...................... E21B 47/122
                                                367/182
5,834,675 A * 11/1998 Boss ...................... F42C 17/04
                                                235/408

(Continued)

FOREIGN PATENT DOCUMENTS

WO     WO 2011002175 A2     1/2011

OTHER PUBLICATIONS

International Search Report for PCT/US2016/022482 issued Jun. 24, 2016.

(Continued)

*Primary Examiner* — Giovanni Astacio-Oquendo
(74) *Attorney, Agent, or Firm* — Leydig, Voit & Mayer, Ltd

(57) ABSTRACT

A device for capacitive sensing includes: a plurality of sensor electrodes, the plurality of sensor electrodes comprising: a plurality of receiver electrodes and a plurality of transmitter electrodes, wherein a transmitter electrode of the plurality of transmitter electrodes comprises a first portion and a second portion with a separation between the first portion and the second portion; and a processing system, configured to: drive the first portion of the transmitter electrode with a transmitter signal, receive a resulting signal corresponding to the first portion of the transmitter electrode via a first receiver electrode of the plurality of receiver electrodes, receive a reference signal corresponding to the second portion of the transmitter electrode via a second receiver electrode of the plurality of receiver electrodes, and determine a modified resulting signal based on the resulting signal and the reference signal.

20 Claims, 29 Drawing Sheets

(51) Int. Cl.
*G06F 3/044* (2006.01)
*G06K 9/00* (2006.01)

(58) Field of Classification Search
USPC .................. 324/694, 519, 548, 658
See application file for complete search history.

(56) References Cited

U.S. PATENT DOCUMENTS

| | | | |
|---|---|---|---|
| 5,892,403 A * | 4/1999 | Brandt | H03F 1/0244 330/297 |
| 7,053,633 B2 | 5/2006 | Hara | |
| 7,078,918 B2 | 7/2006 | Umeda et al. | |
| 7,099,496 B2 | 8/2006 | Benkley, III | |
| 7,102,364 B2 | 9/2006 | Umeda et al. | |
| 7,298,875 B2 | 11/2007 | Kim et al. | |
| 7,570,789 B2 | 8/2009 | Fujiyoshi | |
| 7,667,468 B1 | 2/2010 | Anderson | |
| 8,005,276 B2 | 8/2011 | Dean et al. | |
| 8,115,497 B2 | 2/2012 | Gozzini | |
| 8,116,540 B2 | 2/2012 | Dean et al. | |
| 8,237,453 B2 | 8/2012 | Badaye et al. | |
| 8,410,795 B1 | 4/2013 | Peng et al. | |
| 8,421,890 B2 | 4/2013 | Benkley, III | |
| 8,638,107 B2 | 1/2014 | Schwartz et al. | |
| 8,791,792 B2 | 7/2014 | Benkley, III | |
| 8,810,543 B1 | 8/2014 | Kurikawa | |
| 8,866,347 B2 | 10/2014 | Benkley, III | |
| 8,888,004 B2 | 11/2014 | Setlak et al. | |
| 8,970,546 B2 | 3/2015 | Schwartz et al. | |
| 2003/0151572 A1 * | 8/2003 | Kumada | G09G 3/3614 345/87 |
| 2004/0247163 A1 | 12/2004 | Hara | |
| 2005/0141263 A1 | 6/2005 | Umeda et al. | |
| 2006/0049834 A1 | 3/2006 | Umeda | |
| 2006/0158202 A1 | 7/2006 | Umeda et al. | |
| 2008/0069413 A1 | 3/2008 | Riedijk et al. | |
| 2009/0123039 A1 | 5/2009 | Gozzini | |
| 2009/0252386 A1 | 10/2009 | Dean et al. | |
| 2009/0267903 A1 | 10/2009 | Cady et al. | |
| 2010/0156795 A1 | 6/2010 | Kim et al. | |
| 2010/0328255 A1 | 12/2010 | Ishizaki et al. | |
| 2011/0141051 A1 | 6/2011 | Ryu | |
| 2011/0148435 A1 | 6/2011 | Schwartz et al. | |
| 2011/0175671 A1 | 7/2011 | Reynolds | |
| 2012/0032895 A1 | 2/2012 | Westerman et al. | |
| 2013/0113730 A1 | 5/2013 | Lo et al. | |
| 2013/0177220 A1 | 7/2013 | Erhart et al. | |
| 2013/0265137 A1 | 10/2013 | Nelson et al. | |
| 2013/0271422 A1 | 10/2013 | Hotelling et al. | |
| 2013/0271426 A1 | 10/2013 | Yumoto et al. | |
| 2013/0314109 A1 | 11/2013 | Kremin et al. | |
| 2014/0152324 A1 | 6/2014 | Schwartz et al. | |
| 2014/0204034 A1 | 7/2014 | Chang et al. | |
| 2014/0210764 A1 | 7/2014 | Shepelev | |
| 2014/0212009 A1 | 7/2014 | Benkley, III et al. | |
| 2014/0266262 A1 * | 9/2014 | Taghibakhsh | G06K 9/0002 324/686 |
| 2015/0030217 A1 * | 1/2015 | Wickboldt | G06K 9/00026 382/124 |

OTHER PUBLICATIONS

U.S. Appl. No. 14/675,018, filed Mar. 31, 2015.
U.S. Appl. No. 14/674,623, filed Mar. 31, 2015.

* cited by examiner

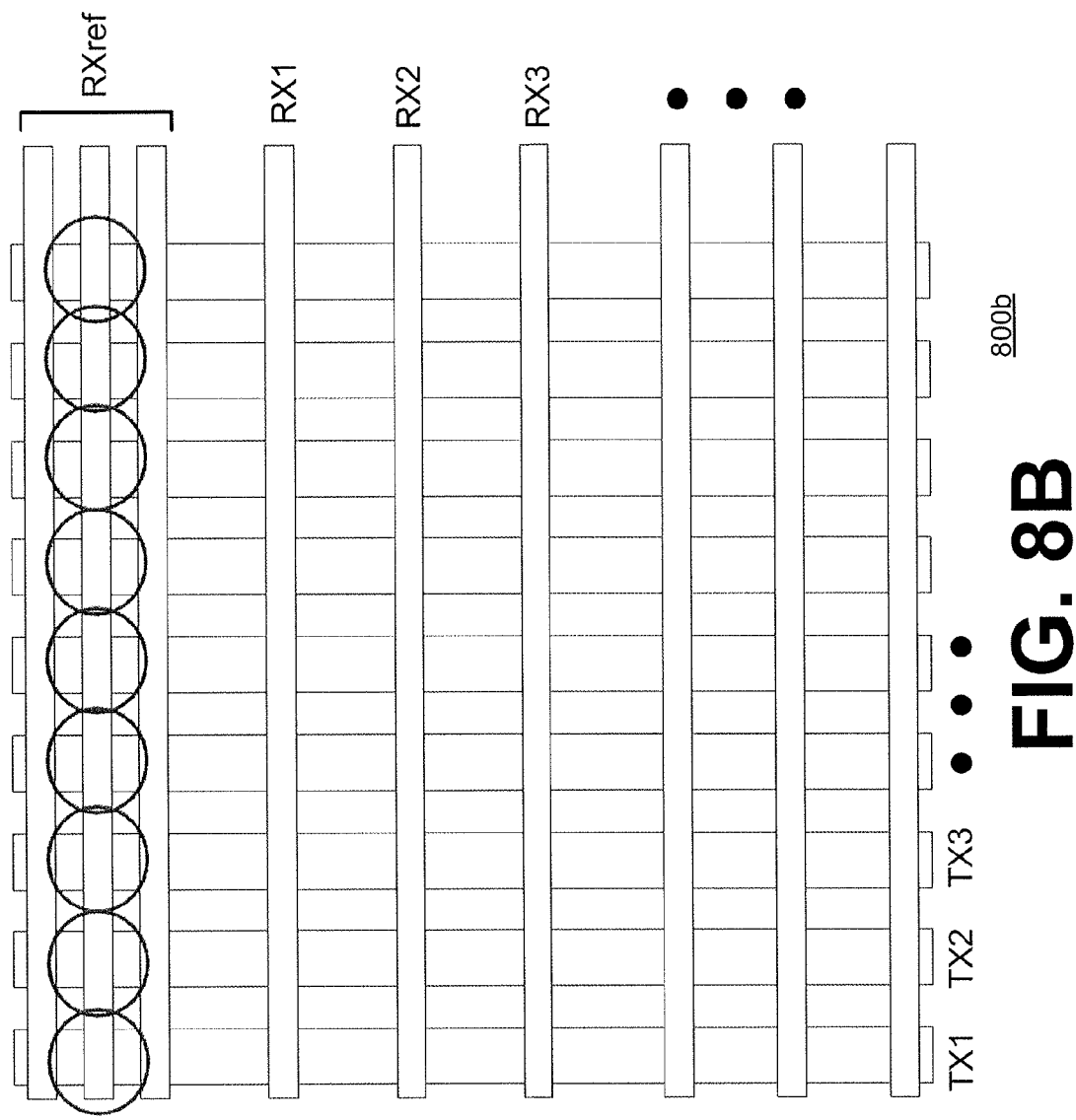

SENSOR ARRAY WITH SPLIT-DRIVE DIFFERENTIAL SENSING

CROSS-REFERENCE TO RELATED APPLICATIONS

This patent application is a continuation-in-part of copending U.S. patent application Ser. No. 14/674,623, filed Mar. 31, 2015, which is incorporated herein by reference in its entirety.

BACKGROUND

Input devices including proximity sensor devices (also commonly called touchpads or touch sensor devices), as well as fingerprint sensors, are widely used in a variety of electronic systems. Proximity sensor devices typically include a sensing region, often demarked by a surface, in which the proximity sensor device determines the presence, location and/or motion of one or more input objects. Fingerprint sensors also typically include a sensing region in which the fingerprint sensor determines presence, location, motion, and/or features of a fingerprint or partial fingerprint.

Proximity sensor devices and fingerprint sensors may be used to provide interfaces for the electronic system. For example, proximity sensor devices and fingerprint sensors are often used as input devices for larger computing systems (such as opaque touchpads and fingerprint readers integrated in, or peripheral to, notebook or desktop computers). Proximity sensor devices and fingerprint sensors are also often used in smaller computing systems (such as touch screens integrated in cellular phones). Such devices and sensors are often susceptible to a variety of types of noise. In certain instances, signal quality is significantly degraded if such noise is not rejected by the system.

SUMMARY

In an exemplary embodiment, a device for capacitive sensing includes: a plurality of sensor electrodes, the plurality of sensor electrodes comprising: a plurality of receiver electrodes and a plurality of transmitter electrodes, wherein a transmitter electrode of the plurality of transmitter electrodes comprises a first portion and a second portion with a separation between the first portion and the second portion; and a processing system, configured to: drive the first portion of the transmitter electrode with a transmitter signal, receive a resulting signal corresponding to the first portion of the transmitter electrode via a first receiver electrode of the plurality of receiver electrodes, receive a reference signal corresponding to the second portion of the transmitter electrode via a second receiver electrode of the plurality of receiver electrodes, and determine a modified resulting signal based on the resulting signal and the reference signal.

In another exemplary embodiment, a processing system for a capacitive sensing device includes a processor and a memory, wherein the processor is configured to: drive a first portion of a transmitter electrode of the capacitive sensing device with a transmitter signal; receive a resulting signal corresponding to the first portion of the transmitter electrode via a first receiver electrode of the capacitive sensing device; receive a reference signal corresponding to a second portion of the transmitter electrode of the capacitive sensing device via a second receiver electrode of the capacitive sensing device, the second portion of the transmitter electrode being separate from the first portion of the transmitter electrode; and determine a modified resulting signal based on the resulting signal and the reference signal.

In another exemplary embodiment, a method for capacitive sensing for a capacitive sensing device includes: driving, by a processing system of the device, a first portion of a transmitter electrode of the device with a transmitter signal; receiving, by the processing system, a resulting signal corresponding to the first portion of the transmitter electrode via a first receiver electrode of the device; receiving, by the processing system, a reference signal corresponding to a second portion of the transmitter electrode of the device via a second receiver electrode of the device, the second portion of the transmitter electrode being separate from the first portion of the transmitter electrode; and determining, by the processing system, a modified resulting signal based on the resulting signal and the reference signal.

BRIEF DESCRIPTION OF THE SEVERAL VIEWS OF THE DRAWINGS

FIGS. 8A-8B are schematic diagrams of arrays of transmission and receiver lines for a processing system for an input device in an exemplary embodiment;

DETAILED DESCRIPTION

The following detailed description is merely exemplary in nature. There is no intention to be bound by any expressed or implied theory presented in the present disclosure.

Particularly in fingerprint sensors, or other sensors where the pattern being sensed is likely to cover a large portion of the sensor, noise is introduced throughout (e.g., finger-coupled noise in the case of fingerprint sensors). Rejection of such noise by the sensor device allows for better signal quality to be obtained for the pattern being sensed (e.g., for a fingerprint or any other pattern).

Additionally, with respect to certain fingerprint sensors, one aspect of performance may be characterized in terms of false acceptance rate (FAR) or false rejection rate (FRR). Exemplary embodiments described herein include fingerprint sensor configurations which reduce FAR and FRR relative to conventional configurations. The performance of certain fingerprint sensors, e.g., in terms of FAR and FRR, may be degraded by image distortion due to the use of a pattern-dependent reference for the analog front-end (AFE)—for example, for a sensor with a grid of transmission (TX) and receiver (RX) lines, the output on a particular RX line corresponding to a TX line is compared with outputs on other RX lines corresponding to that TX line (e.g., the average of the outputs on the other RX lines) to obtain the output corresponding to a particular coordinate of the grid. This pattern-dependent reference significantly varies for each TX line and slightly varies between RX lines for each TX line. As a result, even if noise from the circuit is zero, a non-random FAR and/or FRR degradation is present (and thus cannot be improved by averaging frames or using code division multiplexing (CDM)). Exemplary embodiments include fingerprint sensor configurations which avoid the image distortion associated with pattern-dependent references, so as to reduce FAR and FRR. The sensor configurations are also usable in other types of proximity sensor devices, such as capacitive touch pad sensors, to facilitate reduction of system-based noise.

Figure 1:
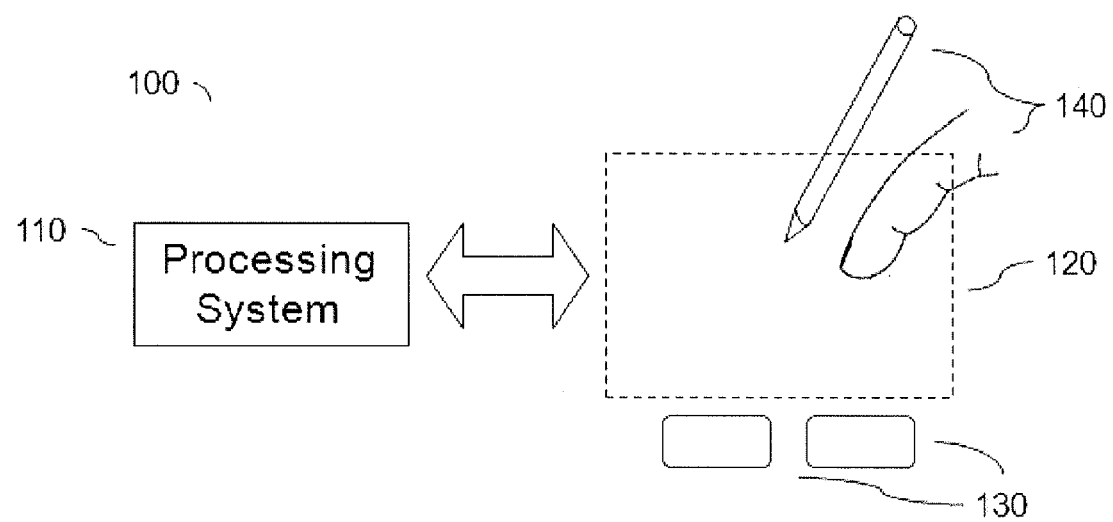
FIG. 1 is a block diagram of an exemplary environment for an input device such as a touchpad sensor.

Turning now to the figures, FIG. 1 is a block diagram of an exemplary environment for an input device 100, usable in accordance with various configurations of the sensors described herein. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. For example, the input device 100 may use capacitive techniques, where voltage or current is applied to create an electric field. Nearby input objects cause changes in the electric field, and produce detectable changes in capacitive coupling that may be detected as changes in voltage, current, or the like.

One exemplary capacitive technique utilizes "mutual capacitance" sensing methods based on changes in the capacitive coupling between sensor electrodes. In various embodiments, an input object near the sensor electrodes alters the electric field between the sensor electrodes, thus changing the measured capacitive coupling. In one implementation, a sensing method operates by detecting the capacitive coupling between one or more transmitter sensor electrodes (also "transmitter electrodes" or "TX electrodes") and one or more receiver sensor electrodes (also "receiver electrodes" or "RX electrodes"). Transmitter sensor electrodes may be modulated relative to a reference voltage to transmit transmitter signals. In various embodiments, the reference voltage may be a substantially constant voltage, or the reference voltage may be system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

It will be appreciated that embodiments described herein are also usable in environments utilizing "self-capacitance" techniques. "Self-capacitance" (or "absolute capacitance") sensing methods are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In one or more embodiments, a first and second module may be comprised in separate integrated circuits. For example, a first module may be comprised at least partially within a first integrated circuit and a separate module may be comprised at least partially within a second integrated circuit. Further, portions of a single module may span multiple integrated circuits.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system 110.

It should be understood that while certain embodiments are described in the context of a fully functioning apparatus, the mechanisms described herein are capable of being distributed as a program product (e.g., software) in a variety of forms. For example, the mechanisms may be implemented and distributed as a software program on information bearing media that are readable by electronic processors (e.g., non-transitory computer-readable and/or recordable/writable information bearing media readable by the processing system 110). Additionally, other types of media may be used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
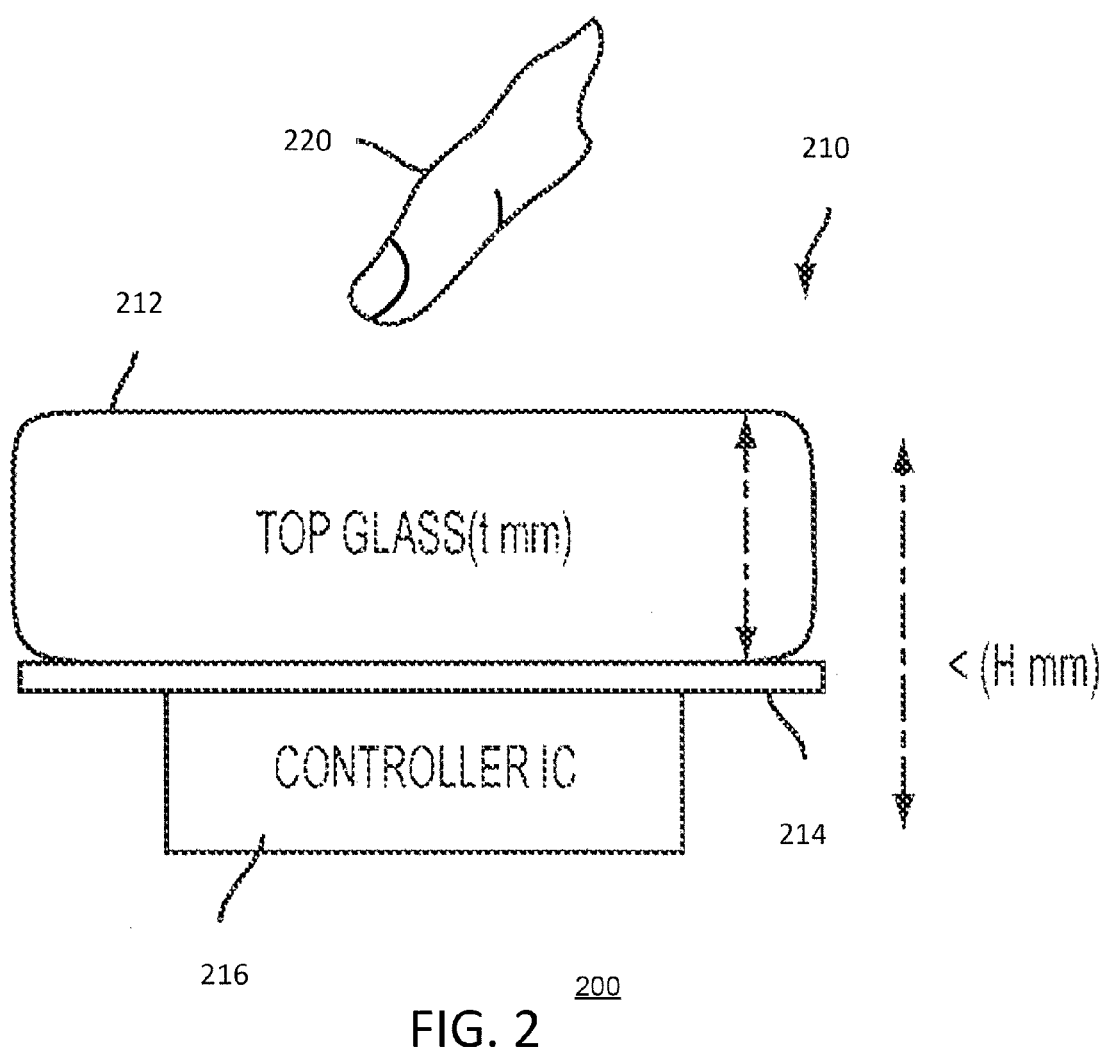
FIG. 2 is a block diagram of an exemplary environment for an input device such as a biometric sensor.

FIG. 2 illustrates a block diagram 200 of another exemplary environment. Included is an example of a biometric sensor 210 for sensing a biometric, such as a fingerprint from a user finger 220. The sensor may be formed on the surface of a top glass 212, which may be part of a display screen, such as a touch screen. The sensor for a biometric or fingerprint sensor may be implemented, for example, using differential readout schemes as described herein. In other embodiments, the sensor may be located on a button, or in a dedicated fingerprint sensing location. According to the illustrated embodiment, on the underside of the glass layer 212 over which the finger 220 of the user may be placed or swiped, may be formed a layer 214 of material, which may be a dielectric and may be flexible, such as a film of Kapton® tape, which may have sensor element electrodes/traces formed on one or both opposing surfaces and may also have mounted thereon, e.g., by a chip on film (COF) or flip chip mounting technique, a sensor controller IC 216 to the substrate containing the sensor element electrodes/traces. As noted in this application, for some embodiments, the entire assembly may be on the order of less than 1 mm in thickness H, e.g., on the order of 0.1 mm in thickness, especially for COF types of packaging when considered without the thickness of the IC, such as when the IC is separate from the sensor. Also, depending on acceptable signal level, the thickness may be on the order of 2 mm or even thicker, e.g., for flip chip mounting packages. While one implementation of a fingerprint sensor is illustrated in FIG. 2, it should be appreciated that sensors according to the exemplary embodiments described herein may be beneficially utilized in a wide variety of fingerprint sensor designs and implementations.

Figure 3A:
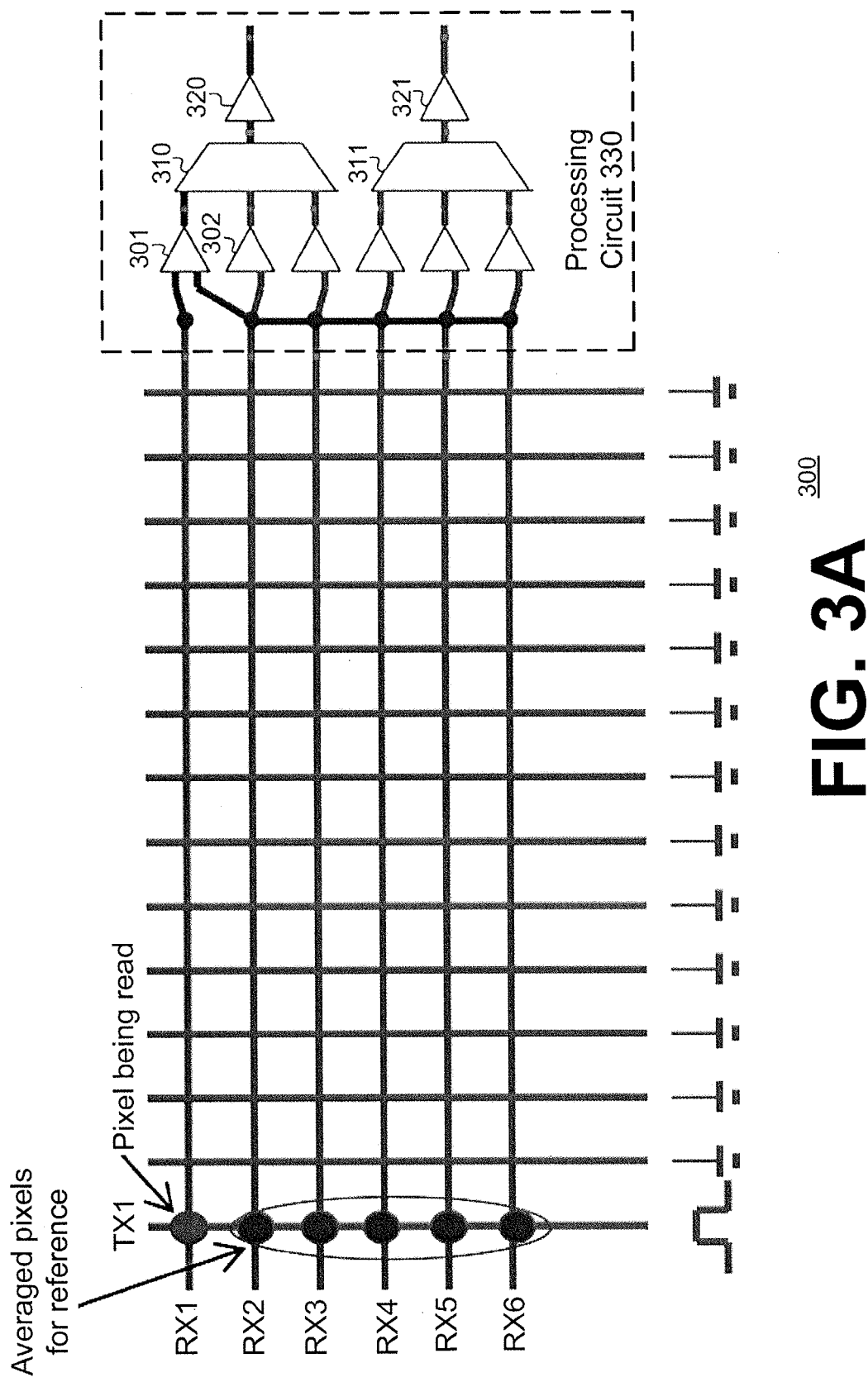
FIGS. 3A-3B are schematic diagrams of a processing system for an input device using a pattern-dependent reference.
Figure 3B:
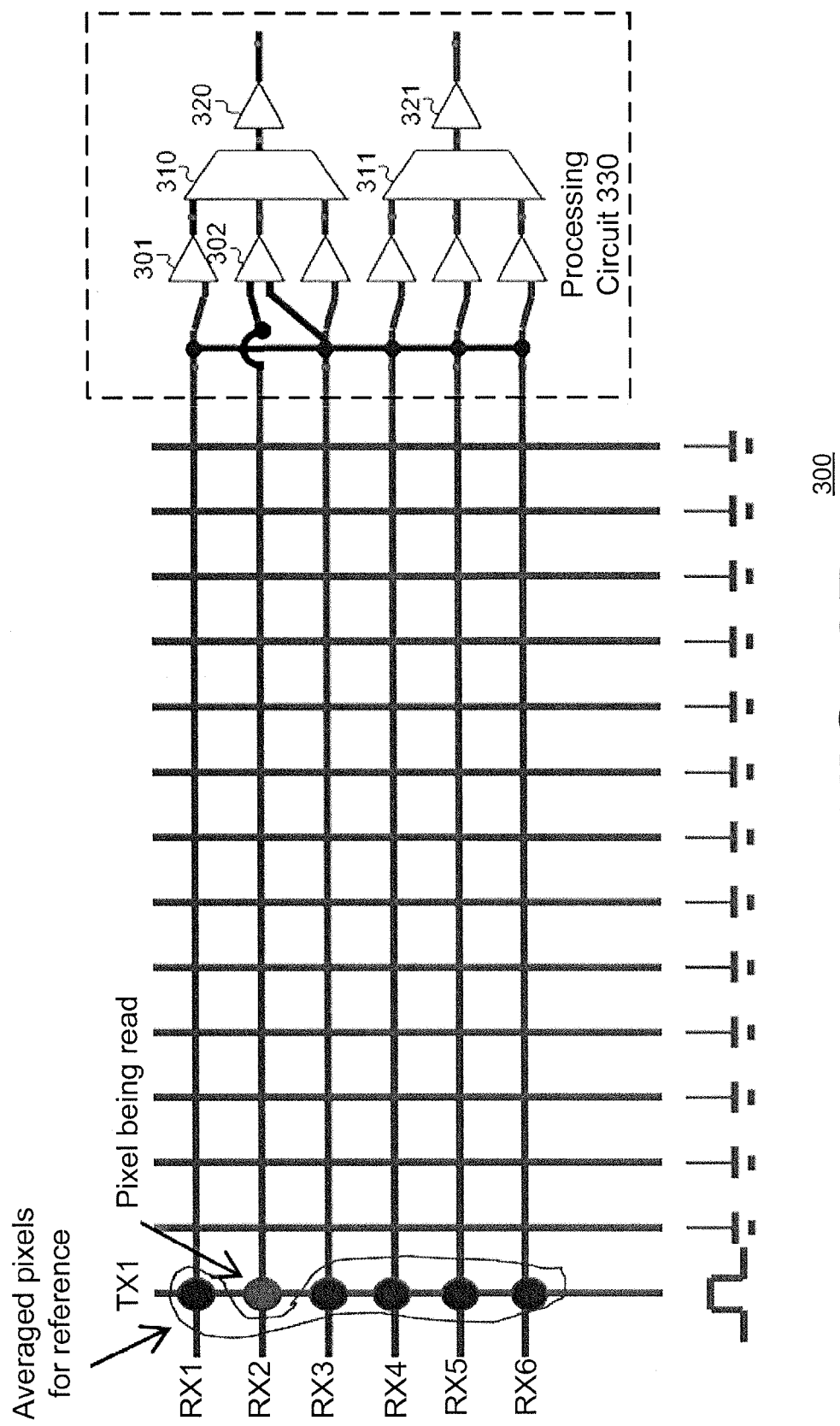

FIGS. 3A and 3B illustrate an exemplary implementation for a processing system 300 that utilizes a pattern-dependent reference. In this implementation, when a particular pixel on a transmission line (or "transmitter sensor electrode") is read on a particular receiver line (or "receiver sensor electrode"), the reading on that receiver line is compared with the average of readings on the other receiver lines corresponding to sensing signals driven on the same transmission line to obtain an output for that coordinate. Specifically, as illustrated in FIG. 3A, when obtaining an output at the pixel where the first transmission line (TX1) overlaps with the first receiver line (RX1), a difference between the reading on RX1 and the average of the readings on RX2-RX6 (the average is produced by shorting the receiver lines RX2-RX6 together) is obtained and amplified via a low-noise amplifier (LNA) 301. Similarly, as illustrated in FIG. 3B, when obtaining an output at the pixel where the first transmission line (TX1) overlaps with the second receiver line (RX2), a difference between the reading on RX1 and the average of the readings on RX1 and RX3-RX6 is obtained and amplified via a LNA 302. It will be appreciated that, although switches are not shown in FIGS. 3A and 3B, the different communication pathways illustrating in FIGS. 3A and 3B are established through the synchronized use of switches with respective receiver lines being read.

The configuration shown in FIGS. 3A-3B using a pattern-dependent reference allows the processing system to obtain an output at particular pixels that reduces environmental noise (since the same environmental noise is present at the receiver line for the pixel being read as is present at the other receiver lines). However, the use of the pattern-dependent reference may introduce distortions into the detected image. For example, in a fingerprint sensor, when a ridge or a valley on the fingerprint spans all of the receiver lines, there may be no difference between the reading on one receiver line and the average of the rest of the receiver lines, such that the fingerprint sensor is unable to determine whether a ridge or a valley is present. Such image distortions cannot be corrected by baseline image subtraction, code division multiplexing (CDM), or measuring temporal noise.

It will be appreciated that FIG. 3 also illustrates a portion of an exemplary processing circuit 330, including components such as the LNAs 301 and 302, MUXs 310 and 311, and VGAs 320 and 321. It will further be appreciated that the processing circuit 330 may be a part of a sensor chip.

Figure 4:
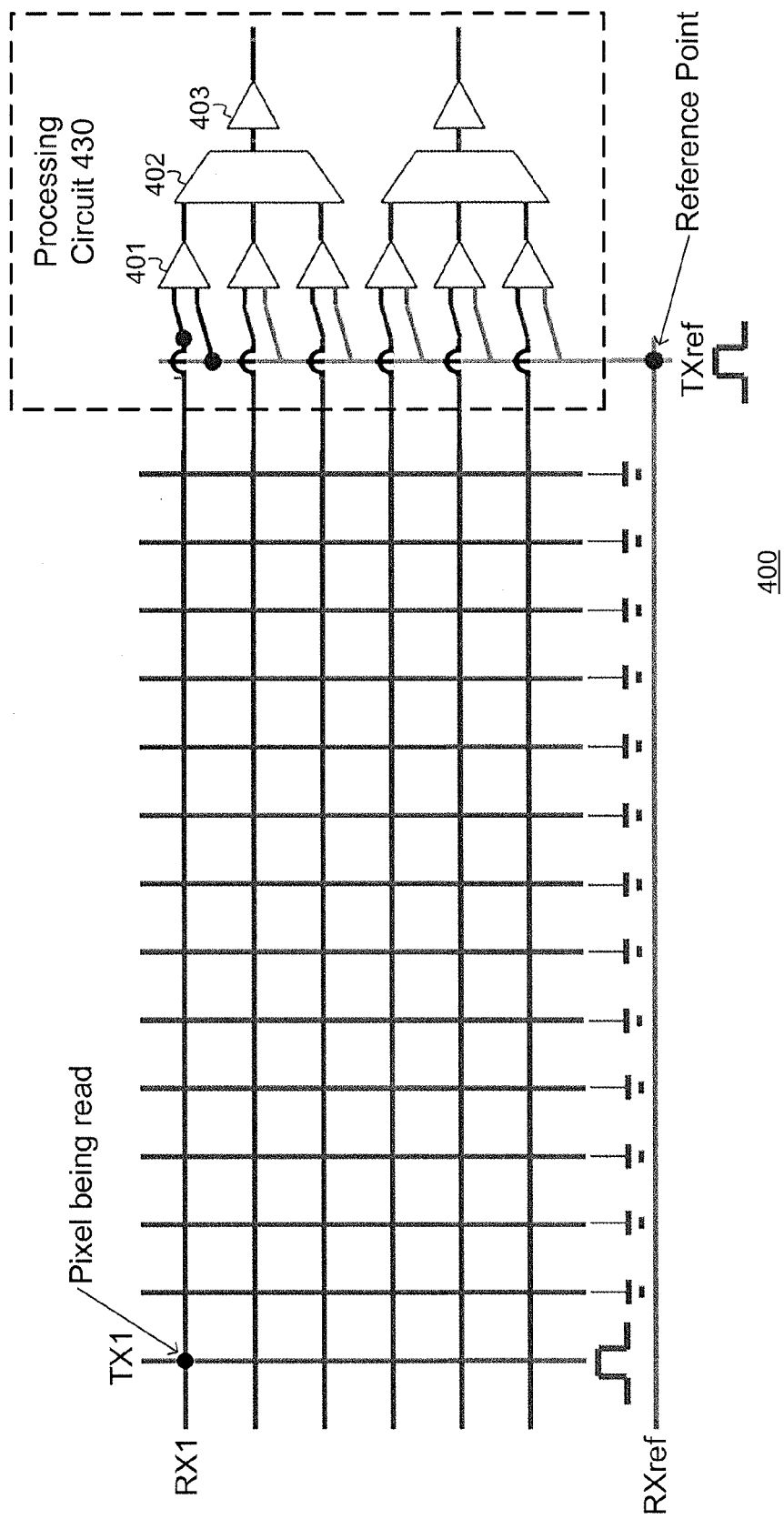
FIG. 4 is a schematic diagram of a processing system for an input device using a fixed reference according to an exemplary embodiment.

FIG. 4 illustrates a processing system 400 that utilizes a fixed reference in accordance with an exemplary embodiment. In the processing system 400, when a particular pixel on a transmission line is read by a particular receiver electrode, the reading on that receiver line corresponding to sensing signals driven on a transmission line is compared with a reading on a reference receiver line (or "reference receiver electrode") corresponding to sensing signals driven on a reference transmission line (or "reference transmitter electrode") to obtain an output for that coordinate. Specifically, as illustrated in FIG. 4, when obtaining an output at the pixel where the first transmission line (TX1) overlaps with the first receiver line (RX1), a difference between the reading on RX1 and a corresponding reading on RXref (at a fixed reference point where a reference transmission line (TXref) overlaps with the reference receiver line (RXref)) is obtained and amplified via a low-noise amplifier (LNA) 401. The output at other pixels is similarly obtained by comparing readings on respective receiver lines with corresponding readings at the fixed reference point.

It will be appreciated that FIG. 4 also illustrates a portion of an exemplary processing circuit 430, including components such as the LNAs (401), MUXs (402), and VGAs (403).

It will be appreciated that each time sensing signals are driven onto a particular transmission line to obtain a reading at a receiver line overlapping that transmission line, corresponding sensing signals (preferably of the same amplitude and shape) are also driven onto the transmission reference line to obtain the reference reading on the reference receiver line.

Because the fixed reference point is on the same sensor plane as the pixels being read, using the difference between the reading at the fixed reference point and a pixel being read reduces or eliminates environmental noise. Further, because a fixed reference point is being used, each pixel of the array of receiver and transmission lines is being compared to the same reference. For example, for a fingerprint sensor, if a ridge is present at the fixed reference point, all pixels corresponding to a frame being read out by the processing system and input device are compared to the ridge. Similarly, if a valley is present at the fixed reference point, all pixels corresponding to a frame being read out by the processing system and input device are compared to the valley. This provides a consistent reference that produces an image without image distortion, since every feature of the fingerprint is identifiable relative to the fixed reference point.

Figure 5:
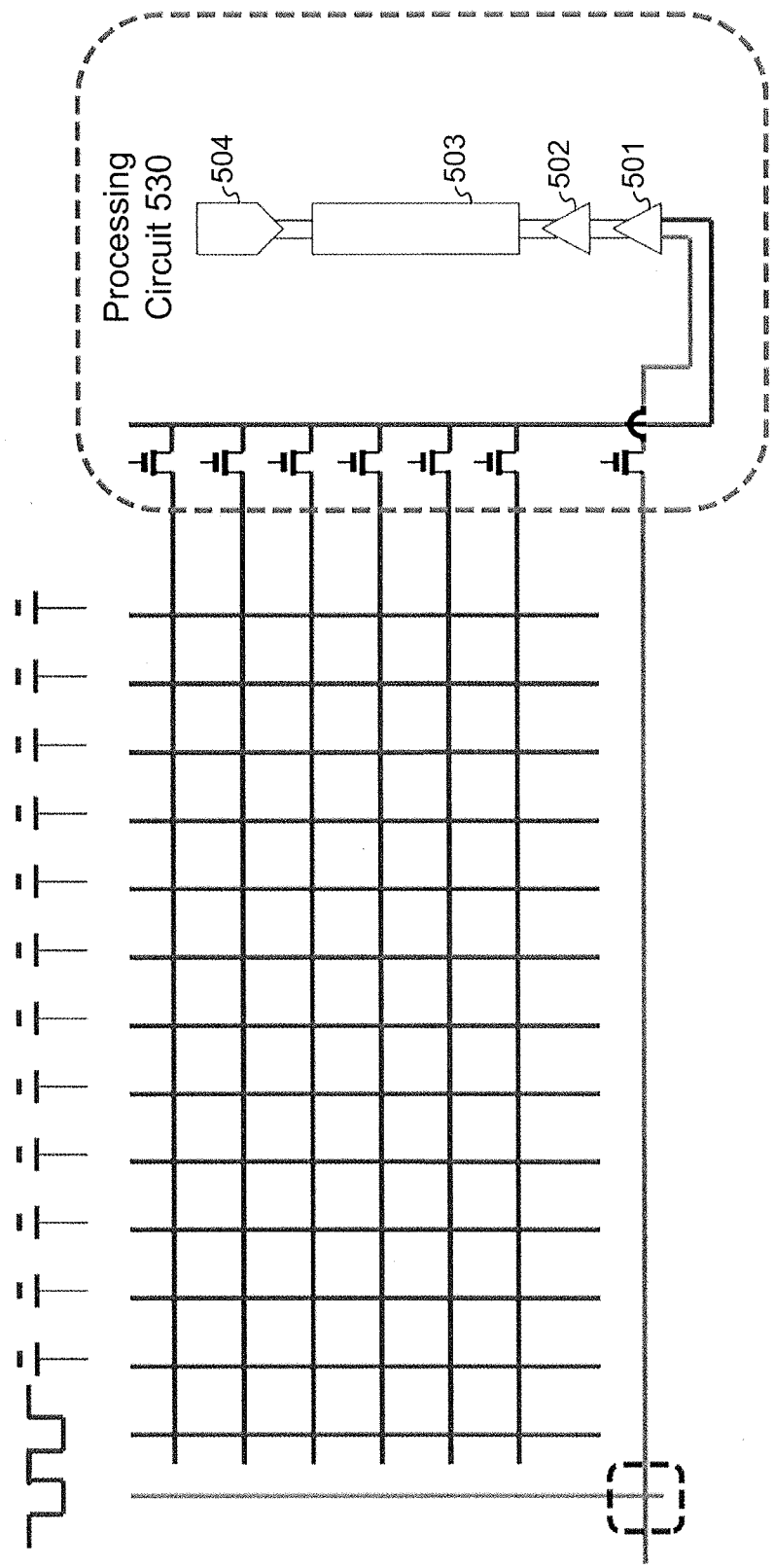
FIG. 5 is a schematic diagram of a processing system for an input device using a fixed reference according to another exemplary embodiment.

The exemplary configuration depicted in FIG. 4 includes one LNA for each receiver line. Having a large number of LNAs allows for fast performance, but may increase cost, power consumption and space required for the processing system. FIG. 5 illustrates a processing system 500 that utilizes a fixed reference in accordance with an exemplary embodiment that is relatively more efficient and lower-cost than the processing system 400 depicted in FIG. 4. In this exemplary embodiment, switches (illustrated in FIG. 5 as transistor switches) are added to each receiver line. Controlling these switches in a synchronized manner with the sensing signals driven onto particular transmission lines and the transmission reference line allows a differential output to be obtained for each pixel, relative to the fixed reference point, using only one LNA 501 for the entire array of transmission and receiver lines.

It will be appreciated that FIG. 5 also illustrates a portion of an exemplary processing circuit 530, including components such as an LNA 501, VGA 502, Mixer 503, and Analog-to-Digital Converter (ADC) 504.

In further embodiments, where a faster reading speed (i.e., framerate) is desired, more LNAs can be added such that certain receiver lines can be read in parallel via two or more LNAs. It will be appreciated that there is thus a tradeoff between cost-savings, circuit space/size and power efficiency versus reading speed, and that, depending on the number of LNAs used in combination with the fixed reference point, different exemplary implementations are able to satisfy different speed requirements while being relatively cost-, space- and power-efficient relative to embodiments having unused LNAs.

Figure 6A:
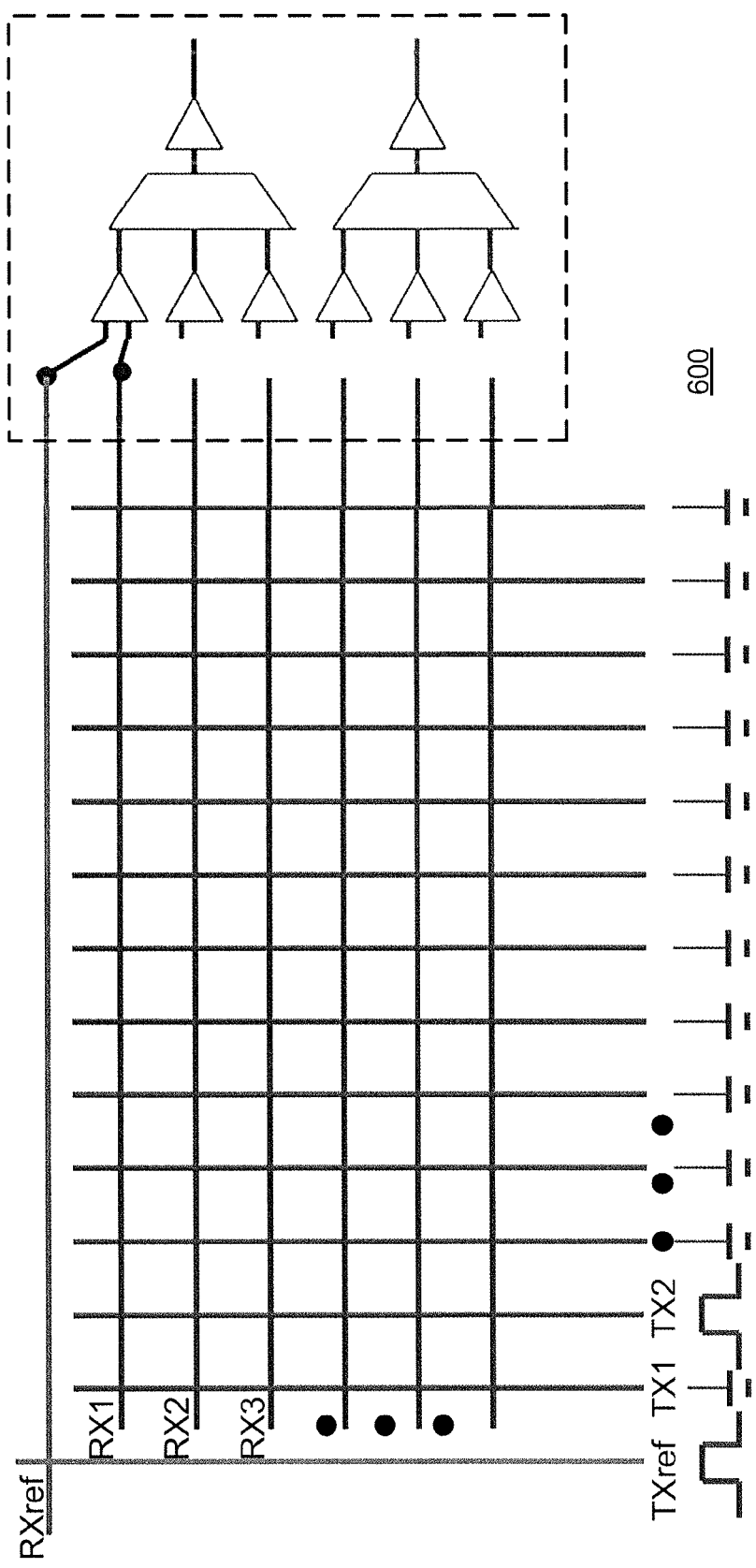
FIGS. 6A-6B are schematic diagrams of a processing system for an input device using a fixed reference with differential adjacent readout according to another exemplary embodiment.
Figure 6B:
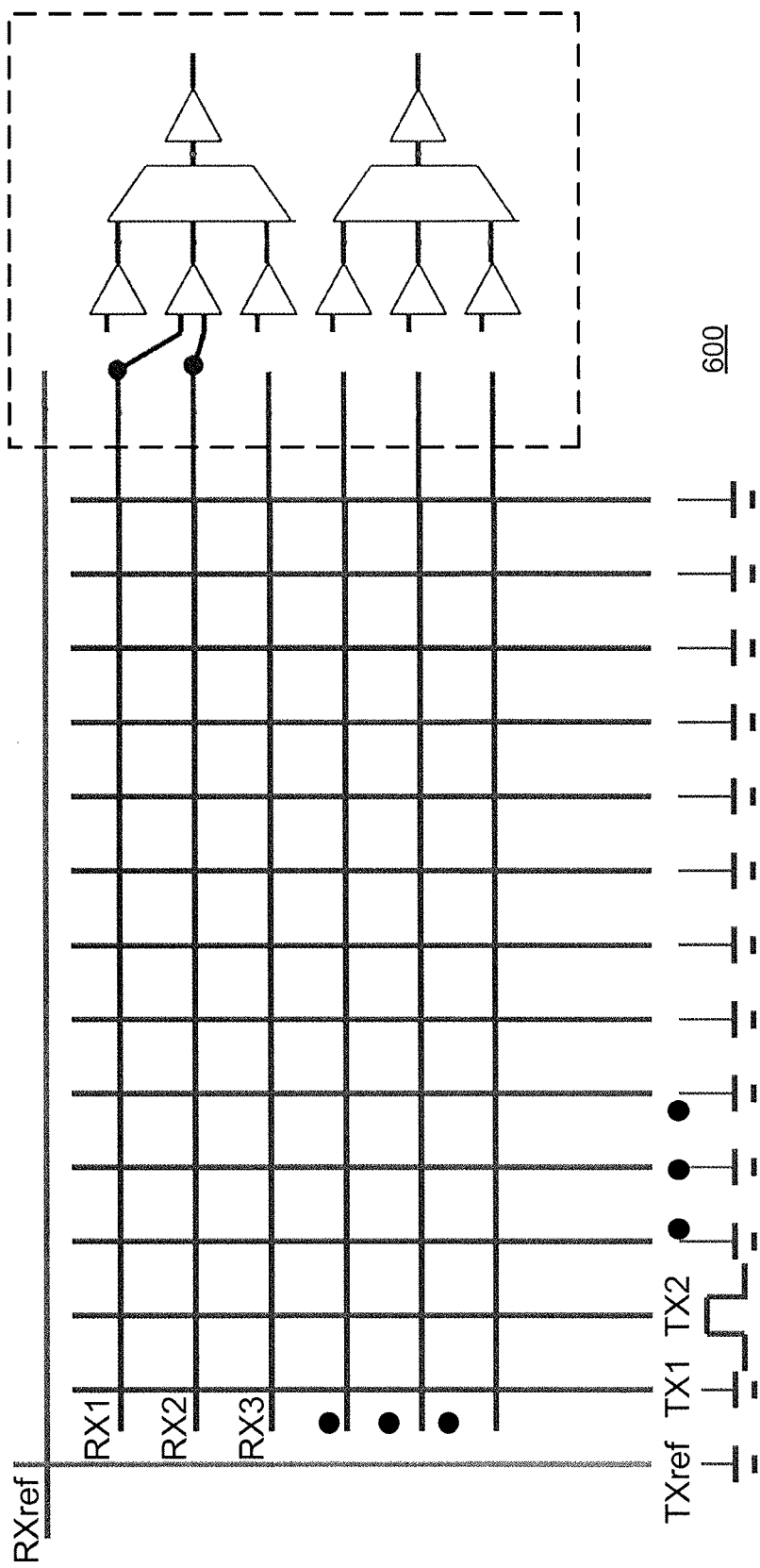

FIGS. 6A-6B illustrates a processing system 600 that utilizes a fixed reference, with differential readouts between adjacent receiver lines, in accordance with another exemplary embodiment. FIG. 6A illustrates a reading taken on a first receiver line RX1 corresponding to sensing signals driven onto a second transmission line TX2. This first reading is obtained relative to a reference reading at the fixed reference point (corresponding to the transmission and receiver reference lines), similar to the discussed above with respect to FIG. 4. FIG. 6B illustrates a reading taken on a second receiver line RX2 corresponding to sensing signals driven onto the second transmission line TX2. This second reading is obtained relative to a reading on the first receiver line RX1. Further readings on further receiver lines are also obtained relative to an adjacent preceding line (e.g., reading on RX3 is obtained relative to a reading on RX2, etc.). It will be appreciated that, although switches are not shown in FIGS. 6A and 6B, the different communication pathways illustrating in FIGS. 6A and 6B are established through the synchronized use of switches with respective receiver lines being read.

This "adjacent differential readout" sensing technique generates "differential" results where the value of each pixel is obtained relative to a previous adjacent receiver line (or the fixed reference for pixels on the first receiver line), which allows for a "differential image" to be generated based on pixel values corresponding to these "differential" results. On the other hand, the embodiments depicted in FIGS. 4-5 utilize a whole-frame fixed reference sensing technique, which generates "absolute" results where the value of each pixel is obtained relative to the fixed reference point, which allows for an "absolute image" to be generated based on pixel values corresponding to these "absolute" results. While the "adjacent differential readout" sensing technique tends to generate relatively more temporal noise (since the final image needs to be reconstructed from the differential image that is generated), the "adjacent differential readout" sensing technique is suitable for significantly reducing system noise with respect to large format systems, and allows for increased correlation of system noise between two adjacent receiver lines. For example, for relatively smaller panels, using the whole-frame fixed reference sensing technique to generate an "absolute image" can provide sufficiently precise removal of system noise even where the receiver line being read and the reference line are not adjacent (e.g., on opposing sides of the array). For relatively larger panels however, correlation of system noise between a receiver line and the reference line that are relatively far away from each other can become degraded, and thus using a "adjacent differential readout" technique in such situations may provide more favorable results.

Figure 7:
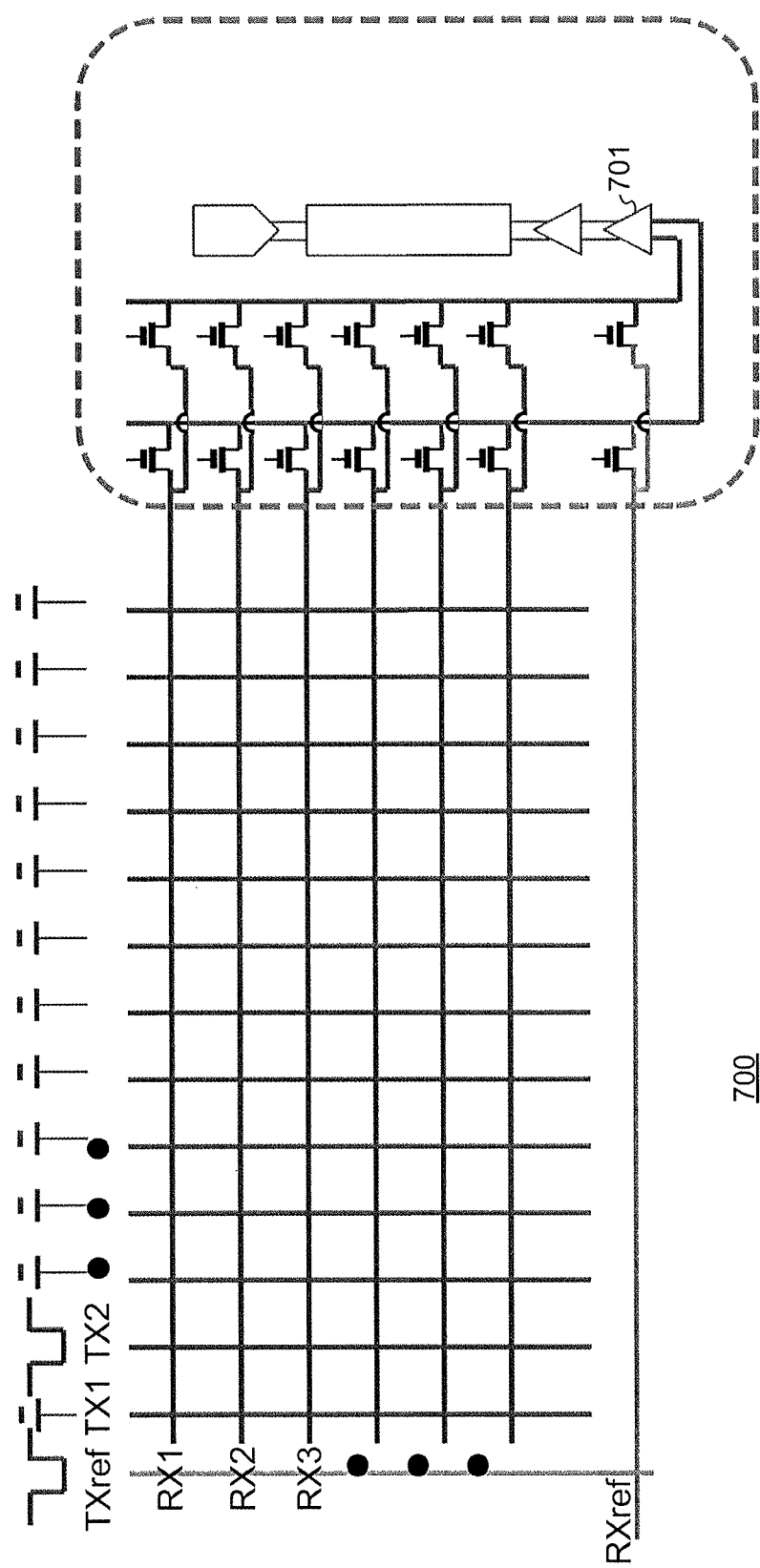
FIG. 7 is a schematic diagram of a processing system for an input device using a fixed reference with differential adjacent readout according to another exemplary embodiment.

FIG. 7 illustrates a processing system 700 that utilizes a fixed reference, with differential readouts between adjacent receiver lines, in accordance with yet another exemplary embodiment that is relatively more efficient in terms of cost, power consumption and space relative to the processing system 600 depicted in FIGS. 6A-6B. The principles of operation of the processing system 700 are similar to processing system 600 in that outputs on each subsequent receiver line is obtained relative to a previous adjacent receiver line, with the output for the first receiver line being obtained relative to a fixed reference point. However, because of the use of only one LNA 701 for the entire array of receiver and transmission lines (along with the depicted switches allowing different receiver lines to be connected to the LNA), a differential image for the entire array is obtainable with a lower-cost and smaller sensor circuit and with less power consumption. Similar to the principles discussed above with respect to FIG. 5, controlling these switches in a synchronized manner with the sensing signals driven onto particular transmission lines allows a differential output to be obtained for each pixel, relative to an adjacent receiver line (or the fixed reference point for the first receiver line), using only one LNA for the entire array of transmission and receiver lines. Further, similar to the principles discussed above with respect to FIG. 5, where a faster reading speed is desired, more LNAs than just the one depicted in FIG. 7 can be utilized such that certain receiver lines can be read in parallel via two or more LNAs.

It will further be appreciated that the processing system 700 may further be operated so as to utilize the whole-frame fixed reference sensing technique instead of the "adjacent differential readout" sensing technique by control of the switches such that, for each receiver line that is read, the switch for that receiver line and the switch for the reference receiver line are turned on (with appropriate corresponding sensing signals driven onto the transmission line and reference transmission line), such that each pixel is compared to the fixed reference point.

Figure 8A:
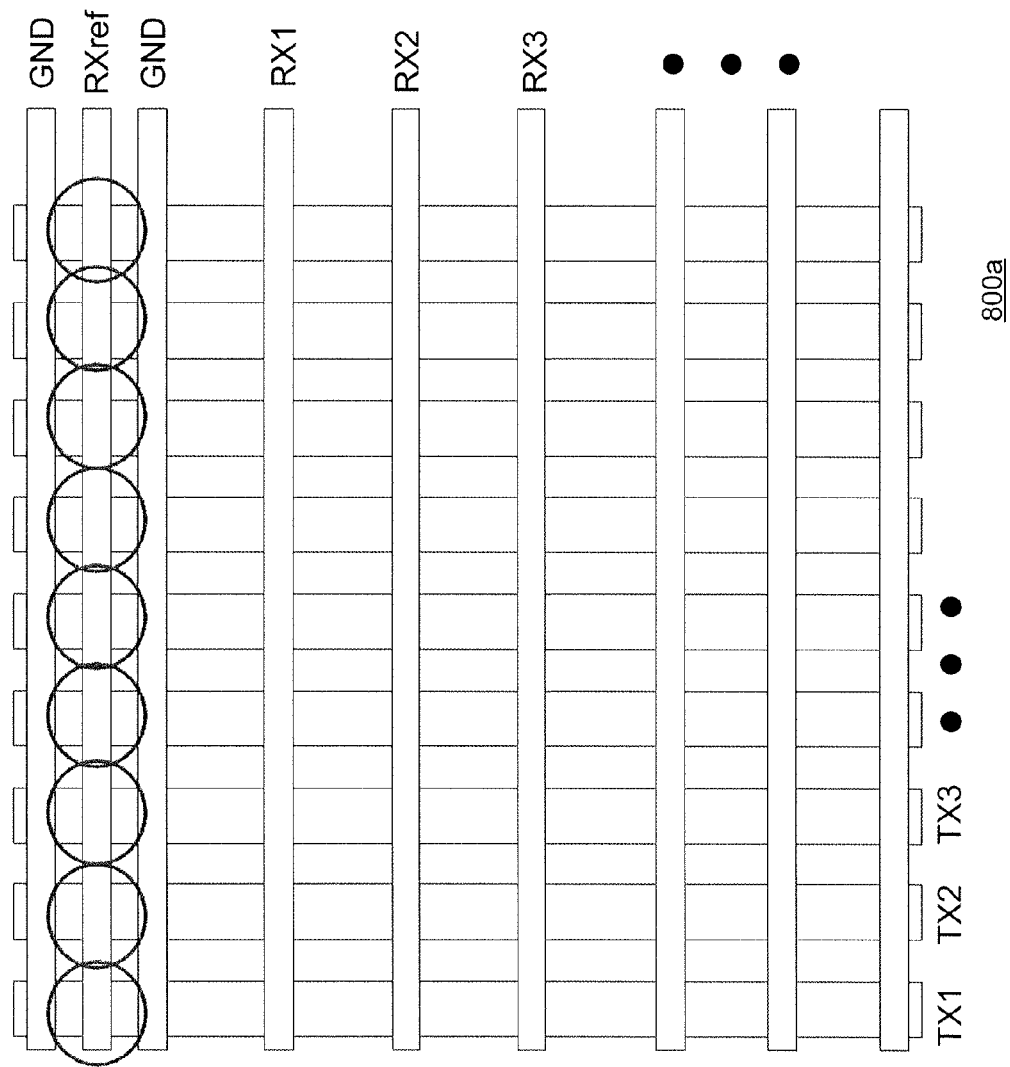

FIGS. 8A and 8B illustrate arrays 800a and 800b of receiver and transmission lines for exemplary embodiments where a dedicated reference transmitter electrode is not used. Instead, in these exemplary embodiments, the reference receiver electrode overlaps with the transmitter sensor electrodes such that the sensing signals driven onto each transmission line for obtaining a reading on a respective receiver sensor electrode are also used to obtain a reference reading for comparison.

FIG. 8A illustrates an exemplary embodiment where the array 800a includes a single reference receiver line that is adjacent to two ground shielding lines, which makes the reference receiver line less sensitive to features of the finger such that, regardless of whether a ridge or valley is present, a substantially constant reference signal (for each transmission line) may be produced on the reference receiver line when a finger is present on the sensor. Thus, the receiver lines from RX1 onwards will be able to produce values for different features (i.e., ridges and valleys) of a finger that are each different from the constant reference signal, and the processing system for the sensor is able to identify the features of the finger based on the differences between the detected values and the constant reference signal.

FIG. 8B illustrates an exemplary embodiment where the array 800b includes three reference receiver lines are used to obtain an average reference reading by shorting the three lines together.

It will be appreciated that the location of the reference point in the embodiments depicted in FIGS. 8A and 8B change for each transmission line, and that other embodiments may include features similar to those shown in FIGS. 8A and 8B while using a constant location for the reference point.

Figure 9A:
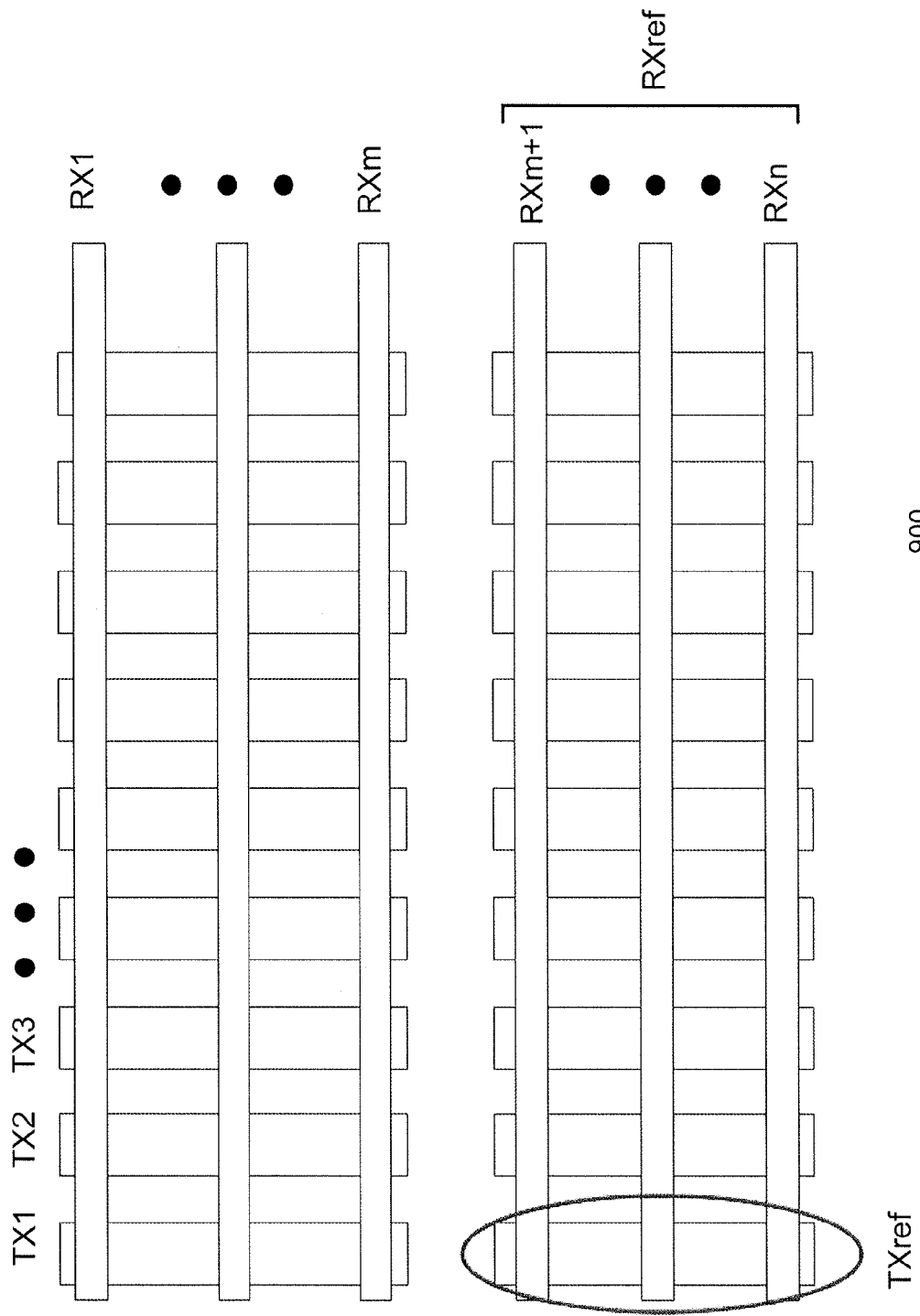
FIGS. 9A-9B are schematic diagrams of an array of transmission and receiver lines for a processing system for an input device in another exemplary embodiment.
Figure 9B:
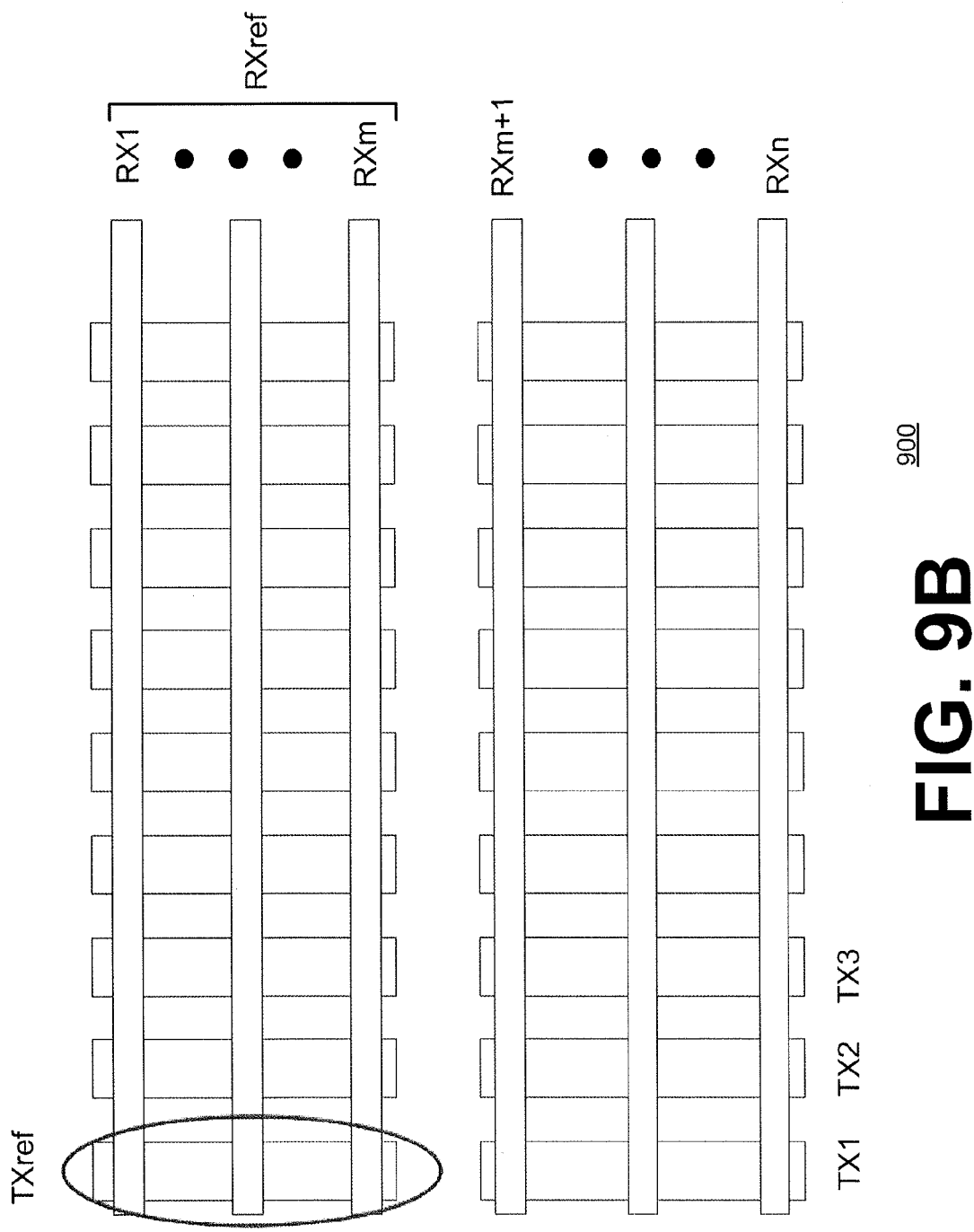

FIGS. 9A-9B illustrate an array 900 of receiver and transmission lines for an exemplary embodiment where receiver and transmitter sensor electrodes are also used as reference receiver and transmitter electrodes, depending on which pixels of the array are being read. Specifically, FIG. 9A illustrates the array 900 while a top half of the array is being read (e.g., for an array with 100 receiver lines, the top half may include the top 50 lines). For each pixel in the top half of the array, a certain transmitter sensor electrode of the bottom half of the array is used as a reference transmitter electrode, and a set of receiver sensor electrodes of the bottom half of the array is used a set of reference receiver electrodes. Conversely, FIG. 9B illustrates the array 900 while a bottom half of the array is being read. For each pixel in the bottom half of the array, a certain transmitter sensor electrode of the top half of the array is used as a reference transmitter electrode, and a set of receiver sensor electrodes of the top half of the array is used a set of reference receiver electrodes. Thus, the array 900 allows the use of a first fixed reference point (or area, when multiple reference receiver lines are used) for the top half of the array, and the use of a second fixed reference point (or area) for the bottom half of the array.

In an exemplary embodiment, the transmitter electrodes used for the top half of the array are not the same as the transmitter electrodes used in the bottom half of the array (in other words, the transmitter electrodes are disjointed as depicted in FIGS. 9A and 9B). Alternatively, in another exemplary embodiment, the transmitter electrodes for the top and bottom halves are the same and are continuous. It will be appreciated that for either of the exemplary embodiments, either the whole-frame fixed reference sensing technique or the "adjacent differential readout" sensing technique can be used to generate an image with respect to each half of the array. Further, it will be appreciated that the portions of the array used as the reference need not be "halves" of the array, and may be portions of the array including multiple receiver lines that are configured to be used as a reference for certain other receiver lines of the array.

Figure 10A:
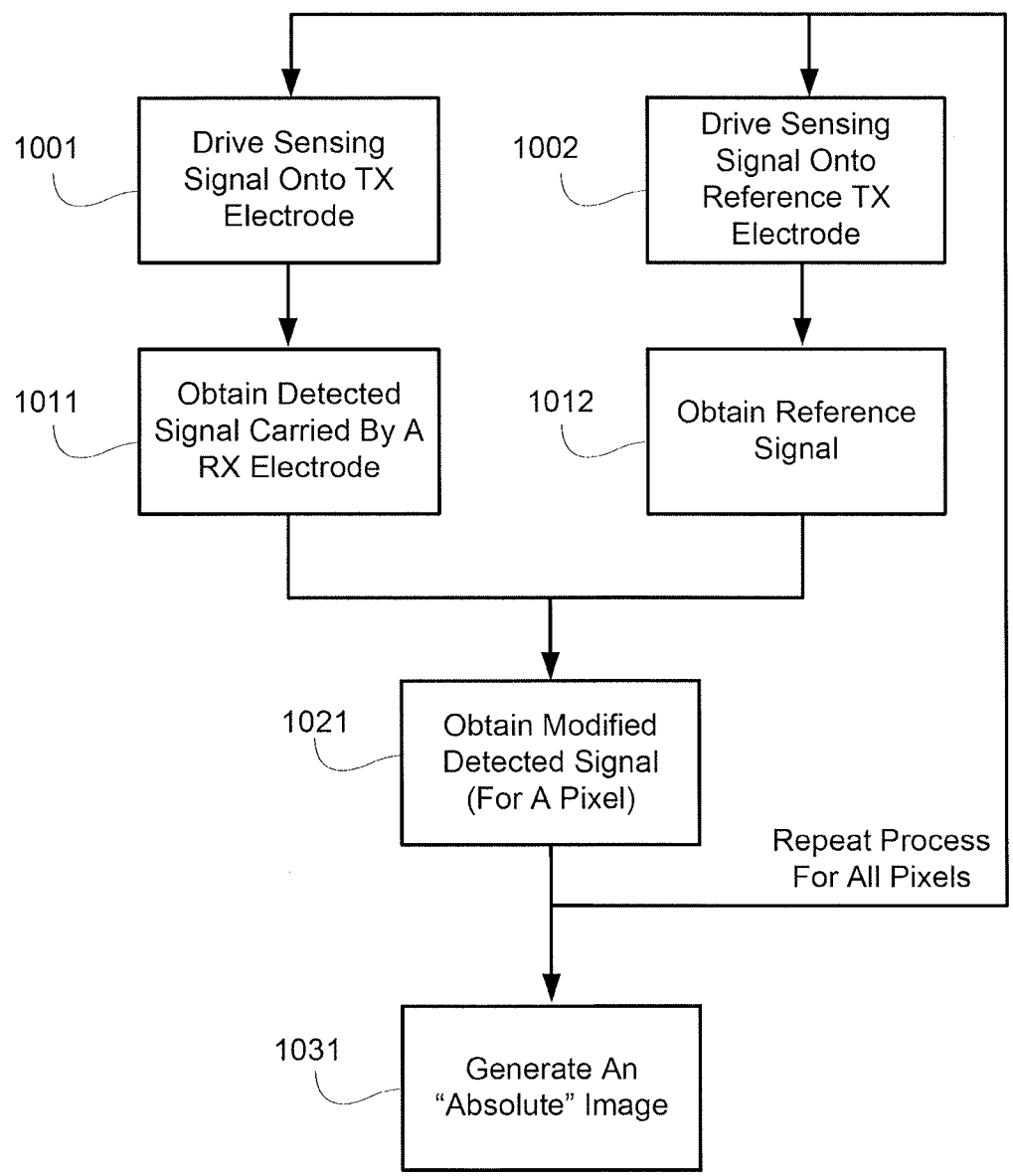
FIGS. 10A-10B are flowcharts illustrating processes for obtaining an image by a processing system for an input device in an exemplary embodiment.
Figure 10B:
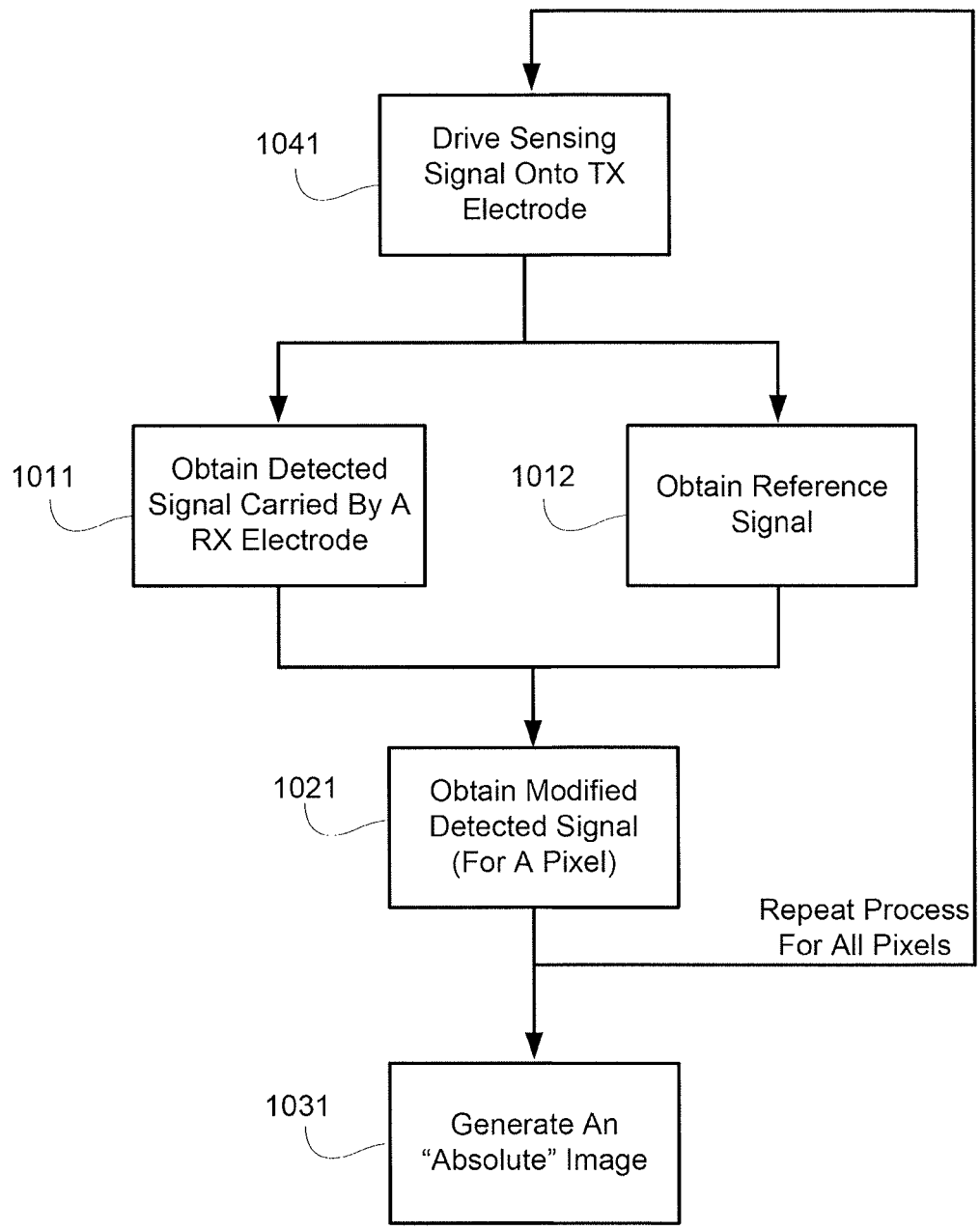

FIGS. 10A and 10B illustrate processes 1000a and 1000b for producing an "absolute" image corresponding to detected signals using whole-frame fixed reference sensing techniques. FIG. 10A illustrates a process 1000a corresponding to embodiments having a reference transmitter electrode that is separate from a transmitter electrode being driven with respect to a corresponding receiver electrode (e.g., as depicted in FIGS. 4, 5, 7 and 9A-9B). At stages 1001 and 1002, sensing signals are synchronously driven onto a reference transmitter electrode and a transmitter electrode. In response thereto, a reference signal is obtained by a reference receiver electrode at stage 1012, and a detected signal is obtained by a receiver electrode based on the transmitter electrode for a pixel to be read at stage 1011. At stage 1021, a modified detected signal is obtained for that pixel by processing the obtained detected signal and the reference signal (including a comparison of the obtained detected signal to the reference signal). This sensing process is repeated for all pixels of the array to generate an "absolute" image at stage 1031.

The process 1000b illustrated in FIG. 10B is similar to the process 1000a, except that process 1000b corresponds to embodiments which do not have a separate reference transmitter electrode. Rather, these embodiments utilize a single transmitter electrode to produce detected signals on both the reference receiver electrode and a receiver electrode corresponding to a pixel to be read (e.g., as depicted in FIGS. 8A-8B and for an alternative embodiment of FIGS. 9A-9B). Thus, the process 1000b is similar to process 1000a except that a separate stage for driving the separate reference transmitter electrode is not used. A single stage 1041 is used to drive sensing signals onto the transmitter electrode to produce detected signals on both the reference receiver electrode and a non-reference receiver electrode.

Figure 11A:
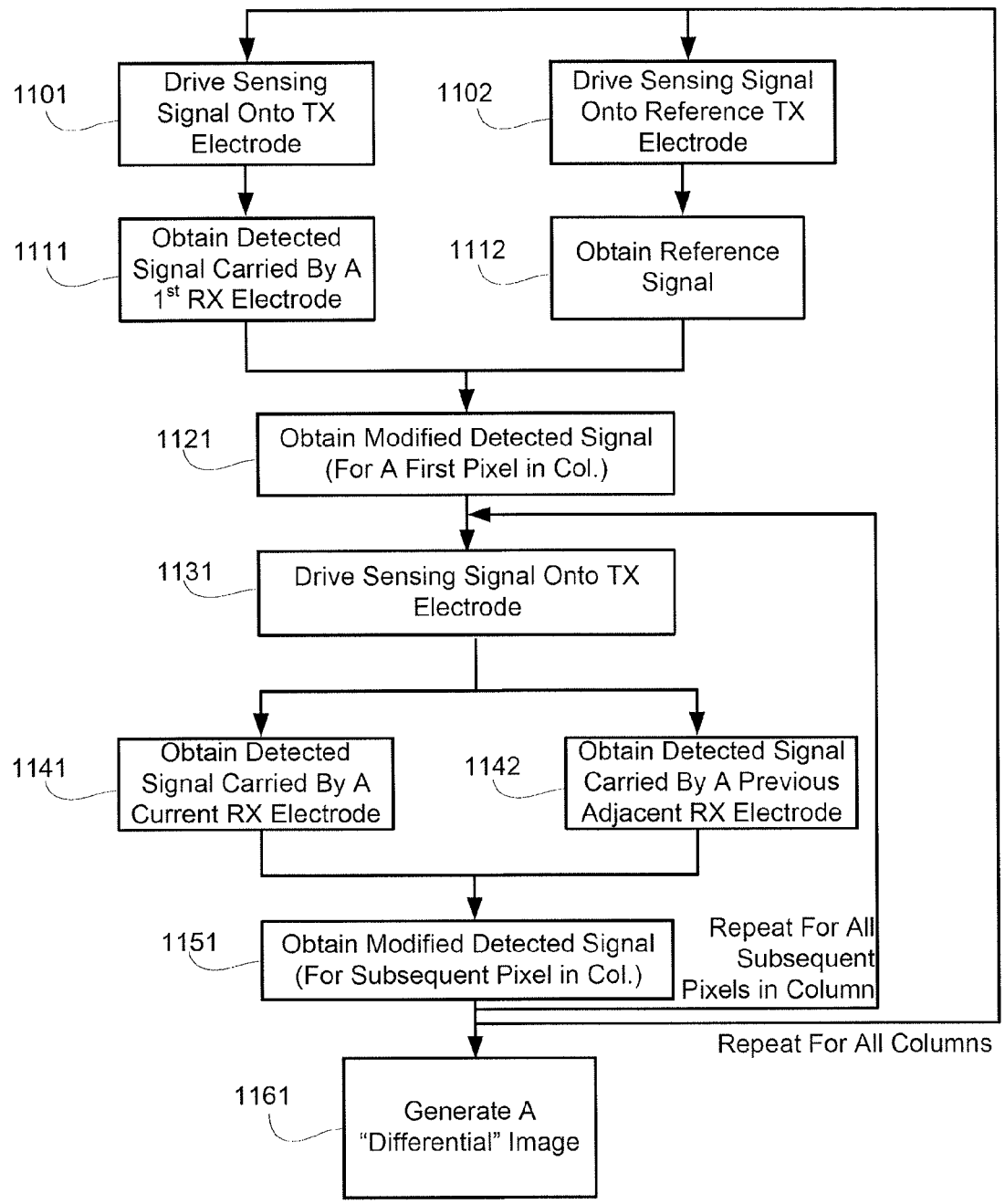
FIGS. 11A-11B are flowcharts illustrating processes for obtaining an image by a processing system for an input device in an exemplary embodiment.
Figure 11B:
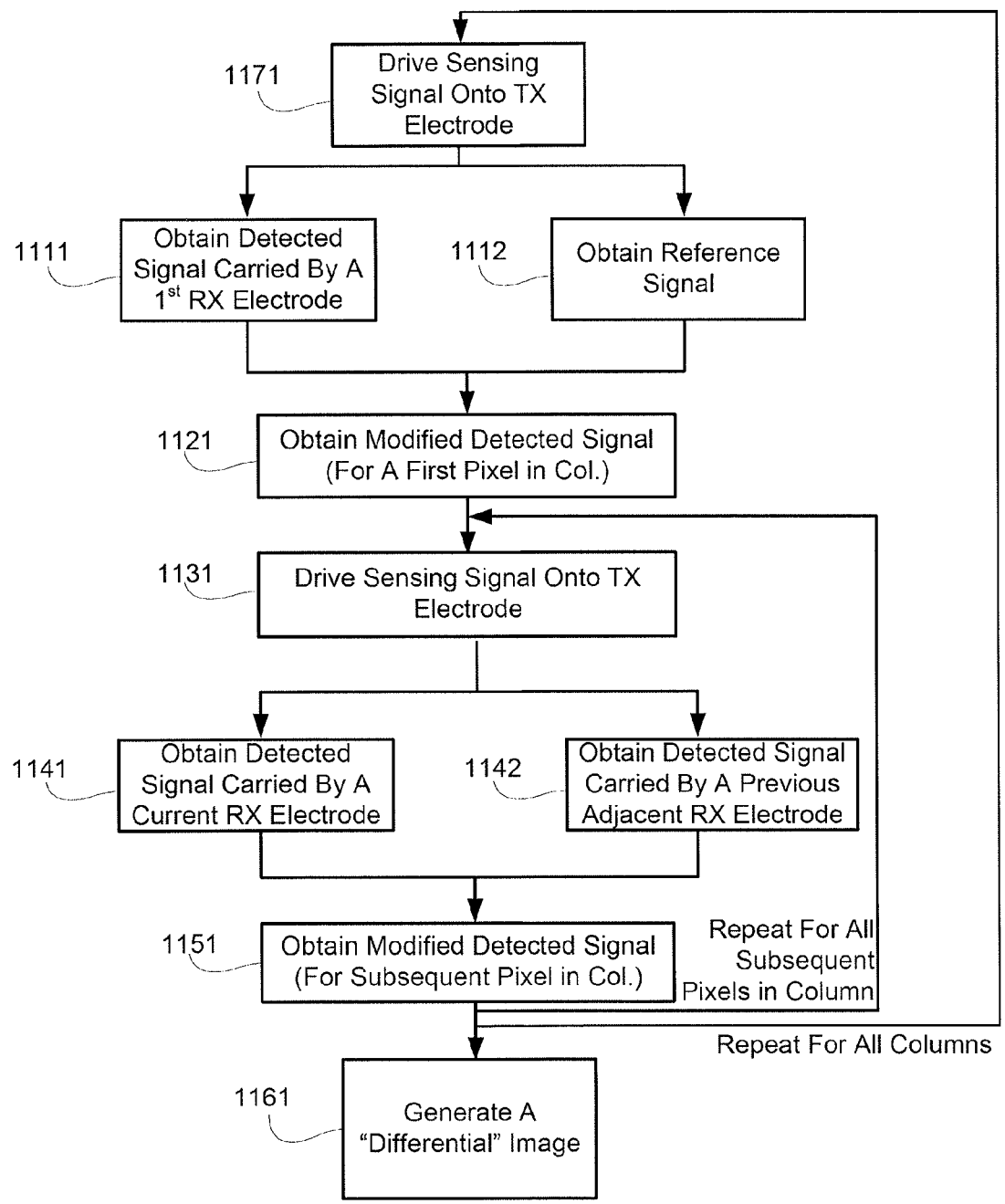

FIGS. 11A and 11B illustrate processes 1100a and 1100b for producing a "differential" image corresponding to detected signals using "adjacent differential readout" sensing techniques. FIG. 11A illustrates a process 1100a corresponding to embodiments having a reference transmitter electrode that is separate from a transmitter electrode being driven with respect to a corresponding receiver electrode (e.g., as depicted in FIGS. 6A-6B, 7 and 9A-9B). At stages 1001 and 1002, sensing signals are synchronously driven onto a reference transmitter electrode and a transmitter electrode. In response thereto, a reference signal is obtained by a reference receiver electrode at stage 1112 (in certain embodiments, the reference receiver electrode may be a part of the array and may be the first receiver electrode in the array and not a separate dedicated reference receiver electrode), and a detected signal is obtained by a first receiver electrode adjacent to the reference receiver electrode based on the transmitter electrode for the first pixel to be read in a column at stage 1111. At stage 1121, a modified detected signal is obtained for that pixel by processing the obtained detected signal and the reference signal (including a comparison of the obtained detected signal to the reference signal).

For all subsequent pixels in the column, process 1100a continues by driving sensing signals onto the transmitter electrode at stage 1131. Detected signals corresponding to a current receiver electrode to be read and corresponding to a previous adjacent receiver electrode that was read are obtained at stages 1141 and 1142. At stage 1151, a modified detected signal is obtained for each subsequent pixel of the column by processing the obtained detected signal for the current receiver electrode and the obtained detected signal for the previous adjacent receiver electrode (including a comparison of the obtained detected signal to the reference signal).

This sensing process is applied to each pixel in each column of the array, as depicted in FIG. 11A, to generate a "differential" image at stage 1161.

The process 1100b illustrated in FIG. 11B is similar to the process 1100a, except that process 1100b corresponds to embodiments which do not have a separate reference transmitter electrode. Rather, these embodiments utilize a single transmitter electrode to produce detected signals on both the reference receiver electrode and a receiver electrode corresponding to a first pixel to be read in a column (e.g., as depicted in FIGS. 8A-8B and for an alternative embodiment of FIGS. 9A-9B). Thus, the process 1100b is similar to process 1100a except that a separate stage for driving the separate reference transmitter electrode is not used. A single stage 1171 is used to drive sensing signals onto the transmitter electrode to produce detected signals on both the reference receiver electrode and a non-reference receiver electrode.

Figure 12:
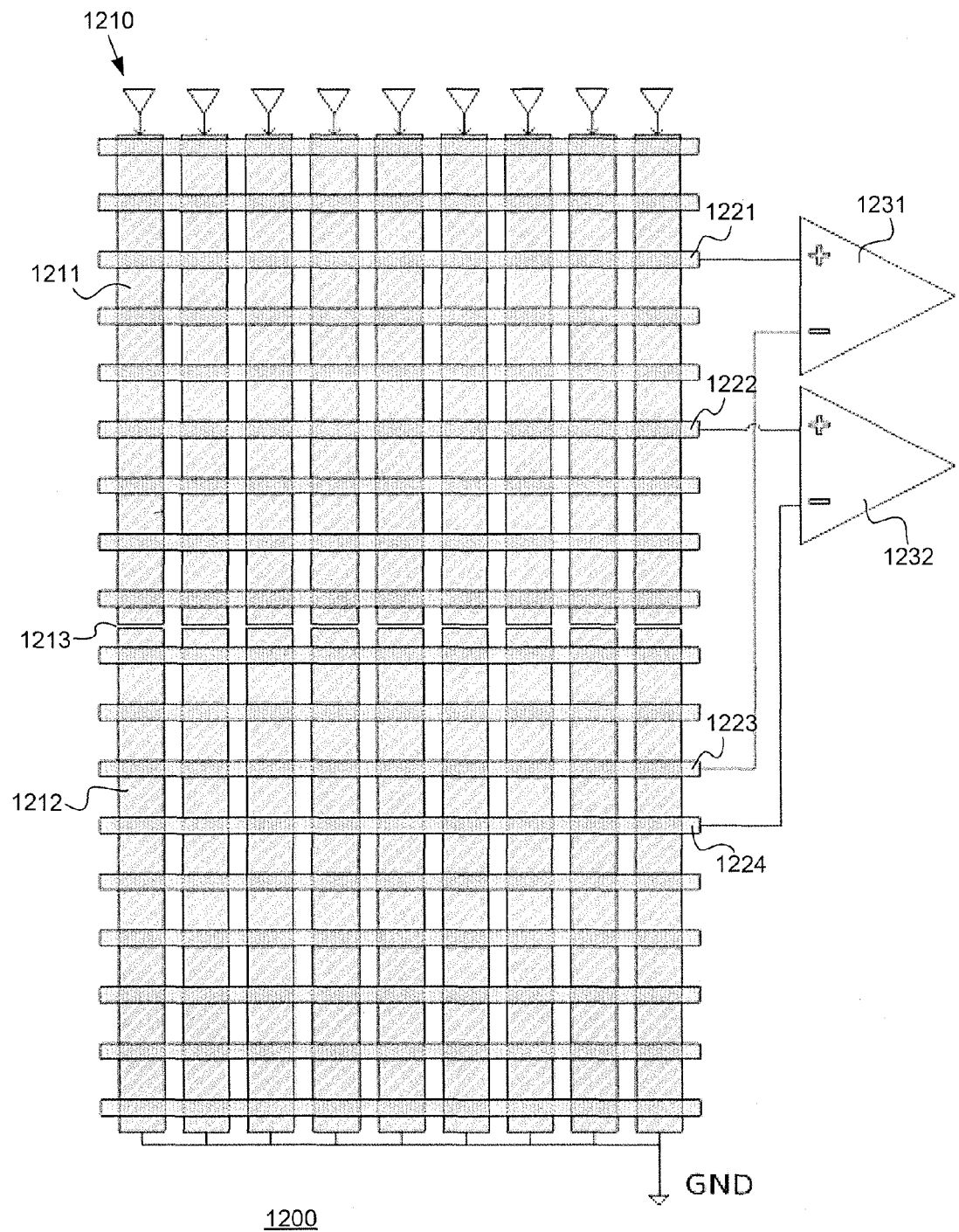
FIG. 12 is a schematic diagram of an array of receiver and transmission lines for a processing system for an input device in an exemplary embodiment utilizing split-drive differential sensing.

FIG. 12 is a schematic diagram of an array 1200 of receiver and transmission lines for a processing system for an input device in an exemplary embodiment utilizing split-drive differential sensing (similar to the embodiment depicted above with respect to FIGS. 9A-9B). Each of the transmitter electrodes of the array 1200 comprises a first portion and a second portion, with a separation between the first portion and the second portion. For example, with respect to transmitter electrode 1210, the first portion 1211 and the second portion 1212 are separated by the separation 1213. The separation isolates the first portion 1211 from the second portion 1212 so that they are not in ohmic contact with each other, allowing them to be separately driven with signals. It will be appreciated that although the transmitter electrode 1210 is referred to herein as a single electrode, the transmitter electrode 1210 may also be understood as multiple separate electrodes (e.g., one electrode corresponding to the first portion 1211 and another electrode corresponding to the second portion 1212) that form a transmission line for the array 1200. For simplicity, the separate electrode portions will be referred to herein as being a transmitter electrode 1210 comprising two portions 1211 and 1212 separated by the separation 1213.

FIG. 12 further depicts exemplary differential amplifiers 1231 and 1232 connected to exemplary receiver electrodes 1221, 1222, 1223 and 1224. In the illustrated example, the first differential amplifier 1231 compares resulting signals from receiver electrode 1221 overlapping with the first portion 1211 of the transmitter electrode 1210 with resulting reference signals from receiver electrode 1223 overlapping with the second portion 1212 of the transmitter electrode 1210. Similarly, the second differential amplifier 1232 compares resulting signals from receiver electrode 1222 overlapping with the first portion 1211 of the transmitter electrode 1210 with resulting reference signals from receiver electrode 1224 overlapping with the second portion 1212 of the transmitter electrode 1210.

In operation, when pixels corresponding to first portions of the transmitter electrodes of the array are being read, one or more of the first portions of the transmitter electrodes are driven with transmitter signals while the second portions of the transmitter electrodes are grounded (or held at some other fixed voltage). The presence of the object being sensed, such as a user's finger, introduces a consistent amount of object-coupled noise (e.g., finger-coupled noise) to pixels corresponding to both portions of the transmitter electrodes. Thus, when resulting signals from a receiver electrode (e.g., receiver electrode 1221) corresponding to a first portion of a transmitter electrode that is driven (e.g., first portion 1211 of transmitter electrode 1210) are compared with resulting reference signals from a receiver electrode (e.g., receiver electrode 1223) corresponding to a second portion of a transmitter electrode that is grounded (e.g., second portion 1212 of transmitter electrode 1210) by a differential amplifier (e.g., differential amplifier 1231), a modified resulting signal is determined with respect to a pixel being read for which the object-coupled noise is effectively removed. Further, because a large number of receiver lines may be used as reference channels for parallel measurement, a relatively strong signal (e.g., corresponding to multiple receiver lines and multiple reference receiver lines being read in parallel) can be obtained with respect to under-glass sensing applications (allowing for relatively shorter measurement times or for more time to be spent for particular pixels in a given capture time relative to sequential measurement techniques).

Once pixels corresponding to the first portions of the transmitter electrodes have been read, the driving status of the top and bottom halves of the sensor array may be swapped such that the first portions of the transmitter electrodes are grounded while the second portions of the transmitter electrodes are driven with transmitter signals. This allows the pixels corresponding to the second portions to be read while removing object-coupled noise based on reference readings from receiver electrodes overlapping the first portions of the transmitter electrodes. By determining modified resulting signals for the pixels of the array, for example, using steps similar to those discussed above with respect to FIGS. 10A-10B and 11A-11B, sufficient data for generating an image of the object being sensed can be obtained.

While the pixels are being read, resulting signals corresponding to pixels from one or multiple transmission lines (e.g., in the example depicted in FIG. 12, multiple transmitter electrode portions from one side of the array) can be obtained simultaneously by driving one or more transmission lines at a time. Thus, in different exemplary embodiments, the driving scheme for the portions of the transmitter electrodes being driven may include one transmission line being driven at a time, two transmission lines being driven at a time, or more than two transmission lines being driven at a time.

In certain exemplary embodiments, for example certain embodiments using CDM schemes, all transmission lines may be simultaneously driven with various phase configurations (e.g., a certain number of transmission lines being driven with transmitter signals having a first phase while the other transmission lines are driven with transmitter signals having a second phase) in multiple steps according to a sequence. The sequence includes stepping through different combinations of transmission lines having different phases, and the readings obtained via the receiver lines are then processed by a processing system based on the phase sequencing to generate an image of the object being sensed.

With respect to the exemplary array depicted in FIG. 12, multiple transmitter electrode portions from one side of the array are simultaneously driven while the transmitter electrode portions from the other side of the array are grounded or held to some other fixed voltage. In other exemplary embodiments, such as those discussed below with respect to FIGS. 16, 17A-C and 18A-B, transmitter electrode portions from both sides of the array may simultaneously be driven as well.

Figure 13:
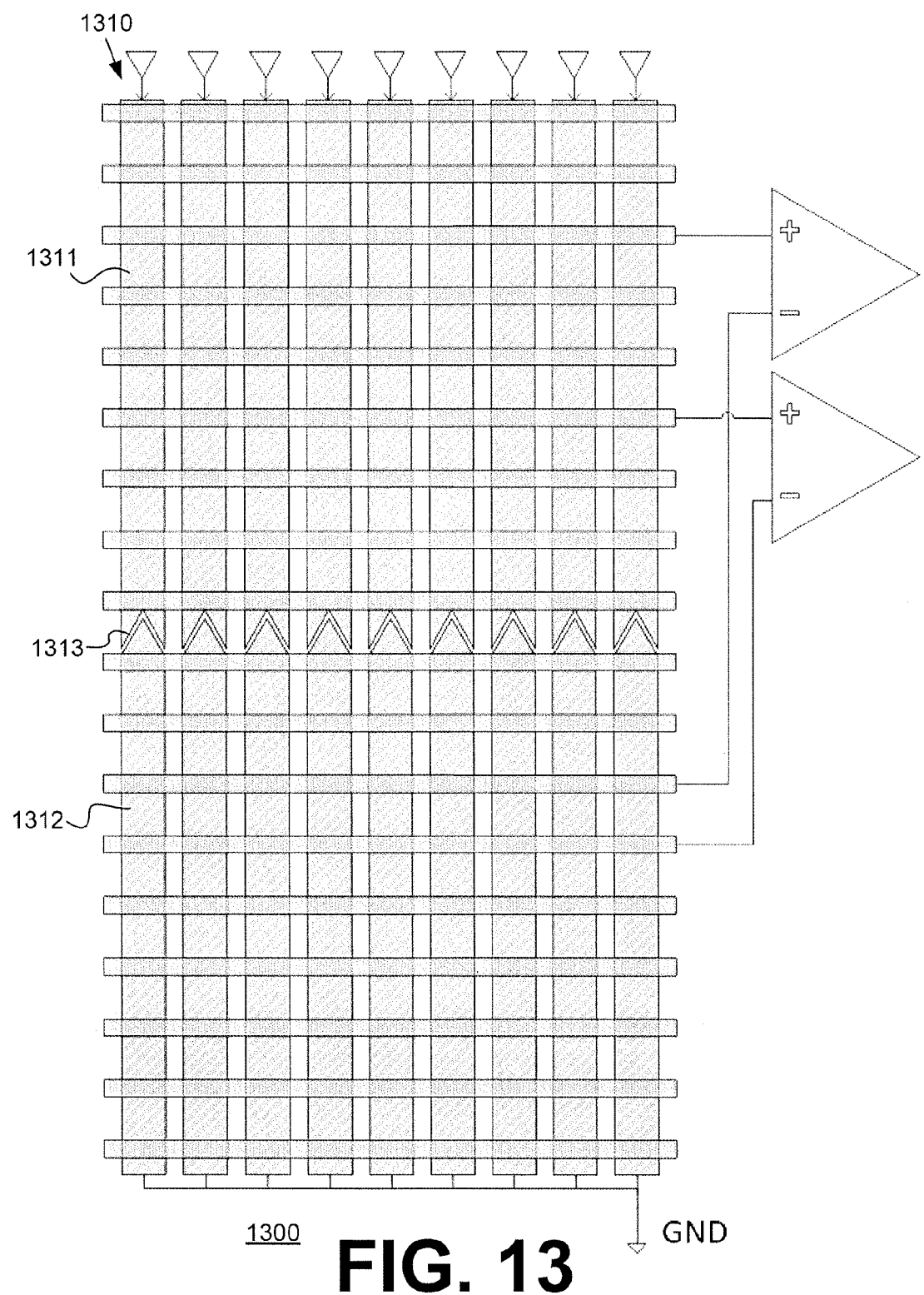
FIG. 13 is a schematic diagram of an array of receiver and transmission lines for a processing system for an input device in another exemplary embodiment utilizing split-drive differential sensing.

FIG. 13 is a schematic diagram of an array 1300 of receiver and transmission lines for a processing system for an input device in another exemplary embodiment utilizing split-drive differential sensing. The transmitter electrodes each include a first portion and a second portion separated via a separation formed in triangular patterns. For example, the first portion 1311 of the transmitter electrode 1310 is separated from the second portion 1312 of the transmitter electrode via the separation 1313, where the separation 1313 includes a triangular pattern. The triangular pattern of the separation 1313 makes the effects of the structural transition from the first portion 1311 to the second portion 1312 more gradual, which reduces the edge effects at the ends of the first and second portions at the separation 1313 relative to, for example, the array 1200 of FIG. 12, which utilizes a horizontal separation. In this manner, less signal loss is achieved on receiver lines near the separation 1313.

Figure 14:
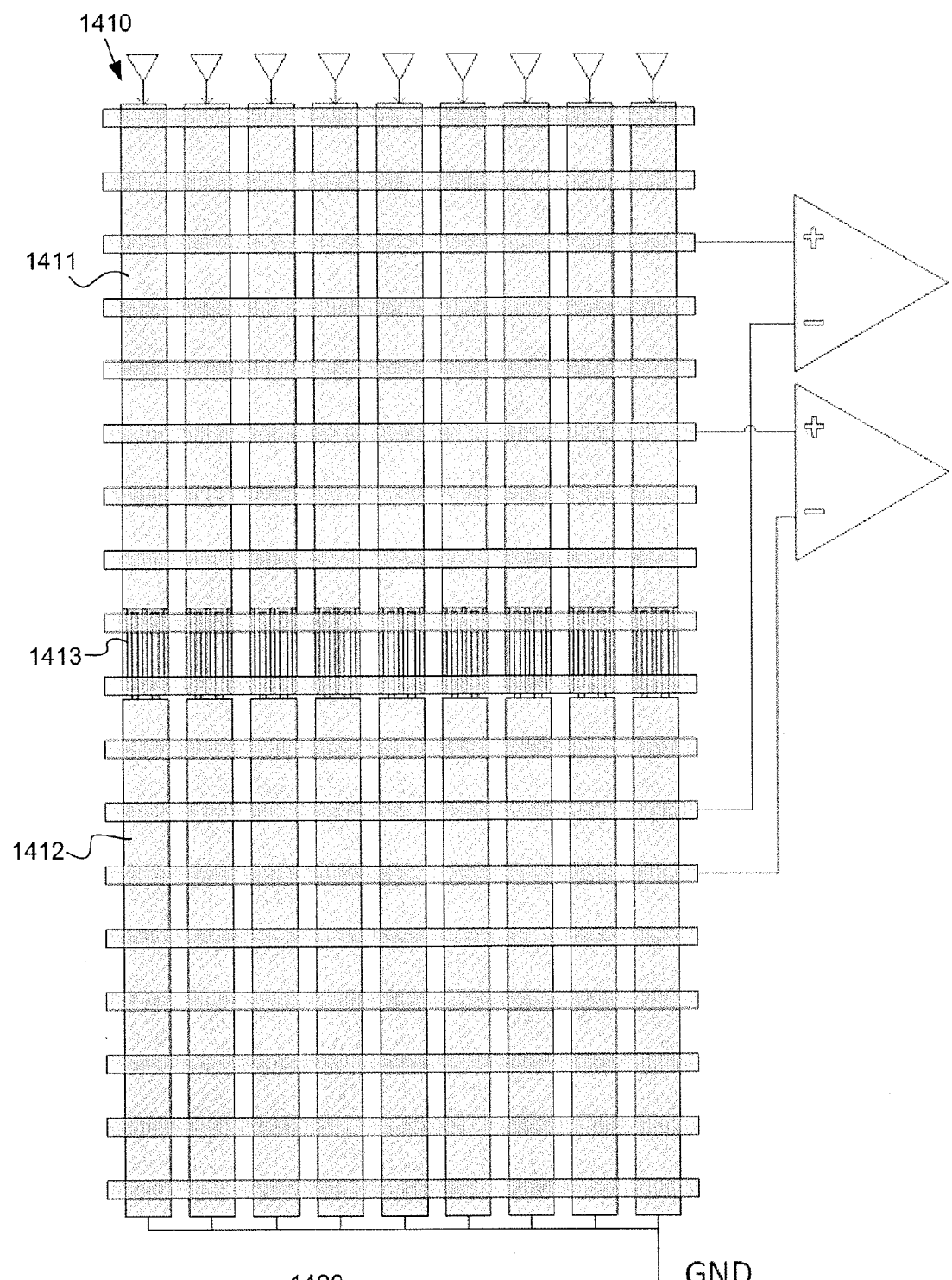
FIG. 14 is a schematic diagram of an array of receiver and transmission lines for a processing system for an input device in another exemplary embodiment utilizing split-drive differential sensing.

FIG. 14 is a schematic diagram of an array 1400 of receiver and transmission lines for a processing system for an input device in another exemplary embodiment utilizing split-drive differential sensing. The transmitter electrodes each include a first portion and a second portion separated such that the first and second portions form an interdigitated pattern. For example, the first portion 1411 of the transmitter electrode 1410 is separated from the second portion 1412 of the transmitter electrode via the separation 1413, such that respective interleaved protrusions of the first and second portions, separated by the separation 1413, form the depicted interdigitated pattern. Similar to the array 1300 of FIG. 13, the interdigitated pattern makes the effects of the structural transition from the first portion 1411 to the second portion 1412 more gradual, such that less signal loss is achieved on receiver lines near the separation 1413. The interdigitated pattern of FIG. 14 provides for reduction of edge effects at pixels near the separation 1413 (although area-wise, each portion of the transmitter electrode forms around half of the total interdigitated portion, when only one half is being driven, the electrical field generated by that half is greater than half of what would be generated by a solid transmission electrode being driven due to fringing effects).

It will be appreciated the horizontal, triangular, and interdigitated separation patterns between portions of the transmitter electrodes, with the patterns being uniformly repeated for all transmission lines, as illustrated in FIGS. 12-14, are merely illustrations of exemplary embodiments. Other exemplary embodiments may utilize different separation patterns between portions of the transmitter electrodes, which may or may not be uniformly repeated with respect to all transmitter electrodes of the array.

It will further be appreciated that the separation between the first and second portions of the transmitter electrodes may be disposed between two adjacent receiver electrodes (e.g., as depicted in FIGS. 12 and 13) or may be disposed so as to overlap with the two adjacent receiver electrodes (e.g., as depicted in FIG. 14). Additionally, in certain exemplary embodiments, receiver lines that are near or that overlap with the separations between transmitter electrodes are not used as reference receiver lines; only receiver lines that are relatively farther from the separation are used as reference receiver lines.

Figure 15:
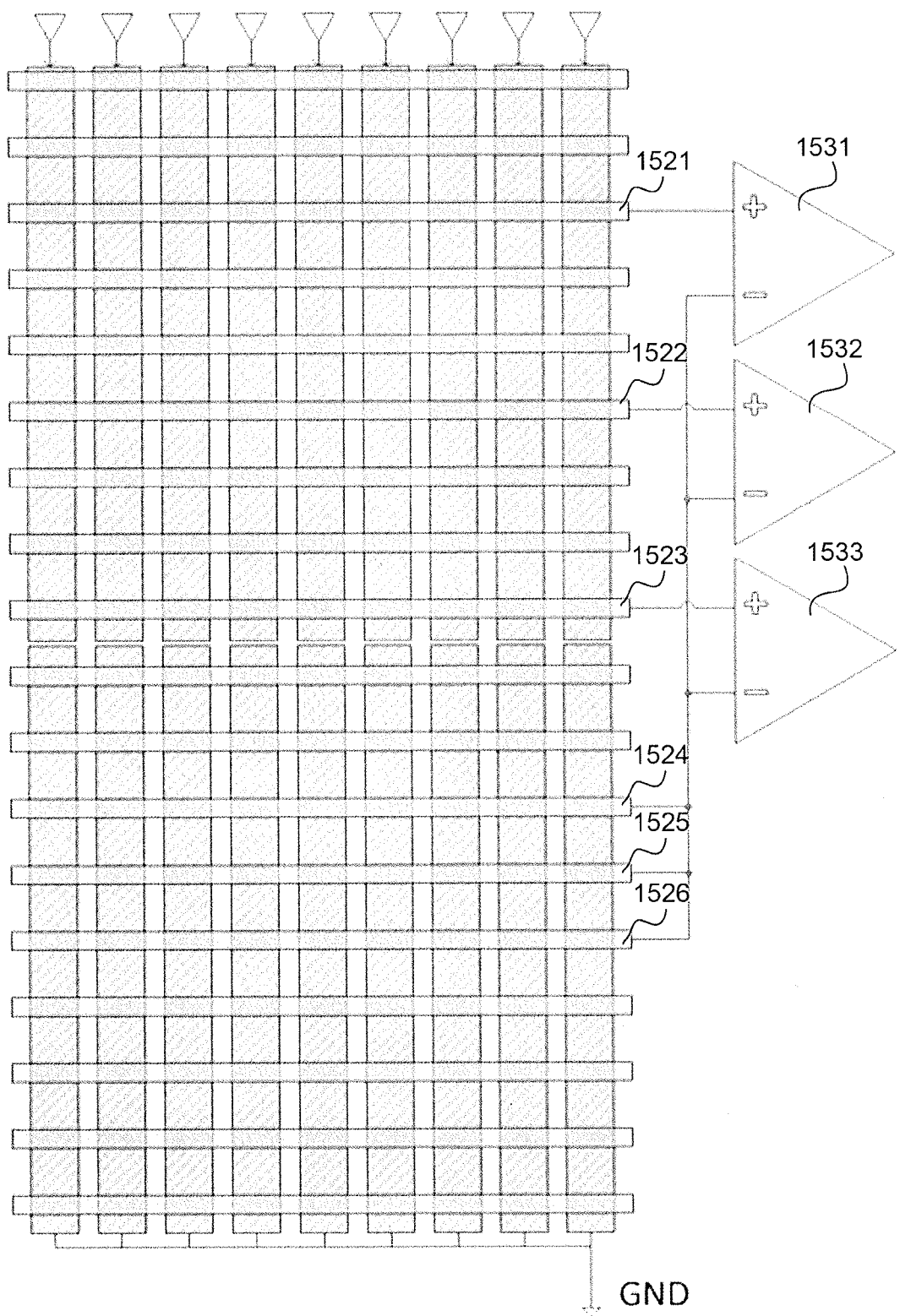
FIG. 15 is a schematic diagram of an array of receiver and transmission lines for a processing system for an input device in another exemplary embodiment utilizing split-drive differential sensing.

FIG. 15 is a schematic diagram of an array 1500 of receiver and transmission lines for a processing system for an input device in another exemplary embodiment utilizing split-drive differential sensing. FIG. 15 further depicts exemplary differential amplifiers 1531, 1532 and 1533 connected to exemplary receiver electrodes 1521, 1522, 1523, 1524, 1525 and 1526. While the top half of the array 1500, which corresponds to the first portions of the transmitter electrodes, is being driven and readings are being obtained with respect to pixels of the top half of the array 1500 in FIG. 15, the first differential amplifier 1531 receives resulting signals from receiver electrode 1521 via a first input and receiver reference signals from a combination of receiver electrodes 1524, 1525 and 1526 via a second input. The second differential amplifier 1532 and third differential amplifier 1533 similarly receive first inputs from respective single receiver electrodes 1522 and 1523 and receive second inputs from the combination of receiver electrodes 1524, 1525 and 1526. Thus, while the bottom half of the array 1500, which corresponds to the second portions of the transmitter electrodes in FIG. 15, is being used to provide reference signals for eliminating object-coupled noise, several receiver lines are combined together to provide a shared reference that is utilized by multiple differential amplifiers of the processing system corresponding to the array 1500.

In certain exemplary embodiments, the number of differential amplifiers used by the processing system is based on the number of reference receiver electrodes combined together to provide the shared reference. For example, in FIG. 15, because three reference receiver electrodes are tied together to provide the shared reference, the processing system utilizes three differential amplifiers so as to provide good matching between the respective inputs of the differential amplifiers.

It will be appreciated that the number of reference receiver lines used to provide the reference may vary in different embodiments, including embodiments that use only one reference receiver electrode to provide the references as well as embodiments that use any number of reference receiver electrodes up to the full number of receiver electrodes overlapping a particular portion of the transmitter electrode. In certain exemplary embodiments using a reference comprised of a combination of reference receiver electrodes, receiver electrodes that are adjacent to or relatively close to the separation between the portions of the transmitter electrodes are not used to provide the combined reference.

Figure 16:
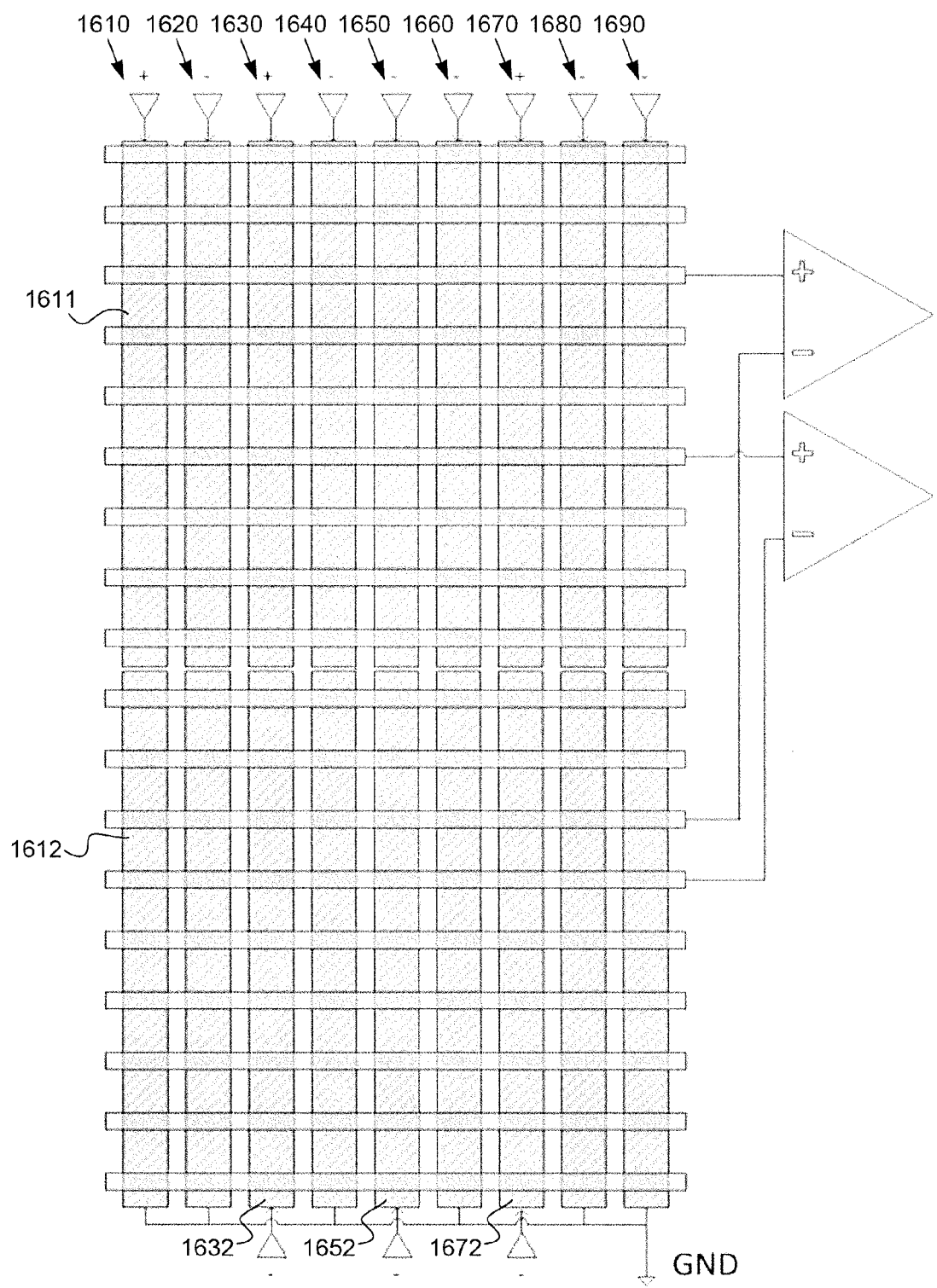
FIG. 16 is a schematic diagram of an array of receiver and transmission lines for a processing system for an input device in another exemplary embodiment utilizing split-drive differential sensing.

FIG. 16 is a schematic diagram of an array 1600 of receiver and transmission lines for a processing system for an input device in another exemplary embodiment utilizing split-drive differential sensing. FIG. 16 further depicts both sides of the array 1600 being provided by driving voltages. In the particular example depicted in FIG. 16, all nine transmission lines (1610, 1620, 1630, 1640, 1650, 1660, 1670, 1680, 1690) are driven with transmitter signals on the top portions of the transmission lines, with different coded phases ("+" and "−") being provided to the respective transmission lines. At the same time, three of the transmission lines (1630, 1650, 1670) are also driven with reference transmitter signals on bottom portions of the transmission lines (1632, 1652, 1672). The other bottom portions (such as bottom portion 1612) are grounded. Providing the reference portion of the array 1600 with reference transmitter signals allows for a stronger signal level to be achieved, which is particularly advantageous, for example, with respect to under-glass sensing applications.

As discussed above, the top portions of the transmission lines are simultaneously driven with various phase configurations in multiple steps according to a sequence. The sequence includes stepping through different combinations of phases for the top portions of the transmission lines. During the entire sequence in which the driving status of the top portions of the transmission lines is changing, the bottom portion is driven the same way—i.e., in a fixed manner. Thus, for example, with respect to FIG. 16, the depicted "+ − + − − − + − −" driving status for the top portion corresponds to just one step and a different configuration of phases may be used in a next step, while the driving status for the bottom portion with bottom portions 1632, 1652 and 1672 being driven as "− − −" remains the same for all steps of the sequence. This provides a consistent reference that allows for object-coupled noise to be subtracted out via the processing system.

In certain embodiments, the summation of the phases being used to drive the top portions should be maintained to be the same as that of the phases being used to drive the bottom portions. Thus, for example with respect to the configuration shown in FIG. 16, the summation of the top portion, which includes 6 transmitter electrode portions driven by "−" transmission signals and 3 transmitter electrode portions driven by "+" transmission signals, has a total summation of 3 "−". The summation for the bottom portion, which includes 3 reference transmitter electrode portions being driven by "−" reference transmission signals, similarly has a total summation of 3 "−".

In other examples, a different combination of "+" and "−" transmission signals having a different summation can be used for the top portion and/or the bottom portion—for example, the bottom portion could include 3 reference transmitter electrode portions being driven by "−" reference transmission signals and 2 reference transmitter electrode portions being driven by "+" reference transmission signals (summation of 1 "−") and be used in combination with the top portion configuration having 5 transmitter electrode portions being driven by "−" transmission signals and 4 transmitter electrode portions being driven by "+" transmission signals (also a summation of 1 "−").

It will be appreciated that the coded phase or CDM techniques discussed above for driving the transmission lines are not limited to split-drive differential sensing configurations and that they can also be used in combination with transmitter electrodes that are not separated into multiple portions.

For ease of understanding, certain features of the embodiments discussed above have been described independently of one of another with respect to each figure. However, it will be appreciated that these features may be used together in various embodiments. For example, in one exemplary embodiment, the combined reference feature depicted in FIG. 15 is utilized together with the multiple simultaneous driving of both sides of the array depicted in FIG. 16, as well as with the interdigitated pattern depicted in FIG. 14. Other exemplary embodiments include various other combinations of the features described herein as well.

It will further be appreciated that, although FIGS. 12-16 generally depict the split-drive differential sensing configurations as having first and second portions of transmitter electrodes being of equal size and having an equal number of receiver electrodes associated therewith, this is not a requirement. Other embodiments utilizing split-drive differential sensing may include transmitter electrodes having first and second portions of different sizes, as well as transmitter electrodes divided into more than just two portions.

Figure 17A:
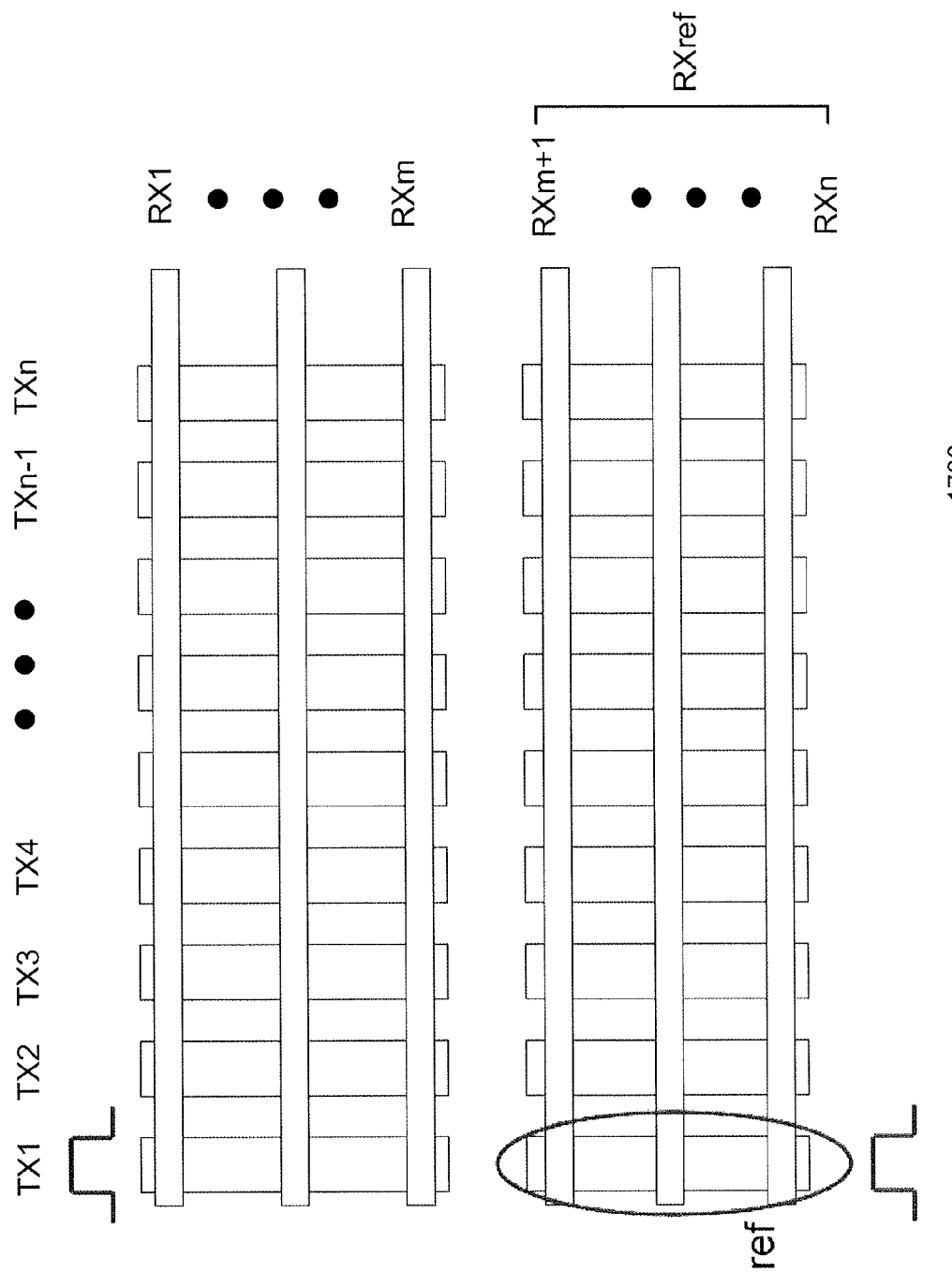
FIGS. 17A-C are schematic diagrams of an array of receiver and transmission lines for a processing system for an input device in another exemplary embodiment utilizing split-drive differential sensing showing an exemplary way of operating the array to obtain readings for the top half of the array.
Figure 17B:
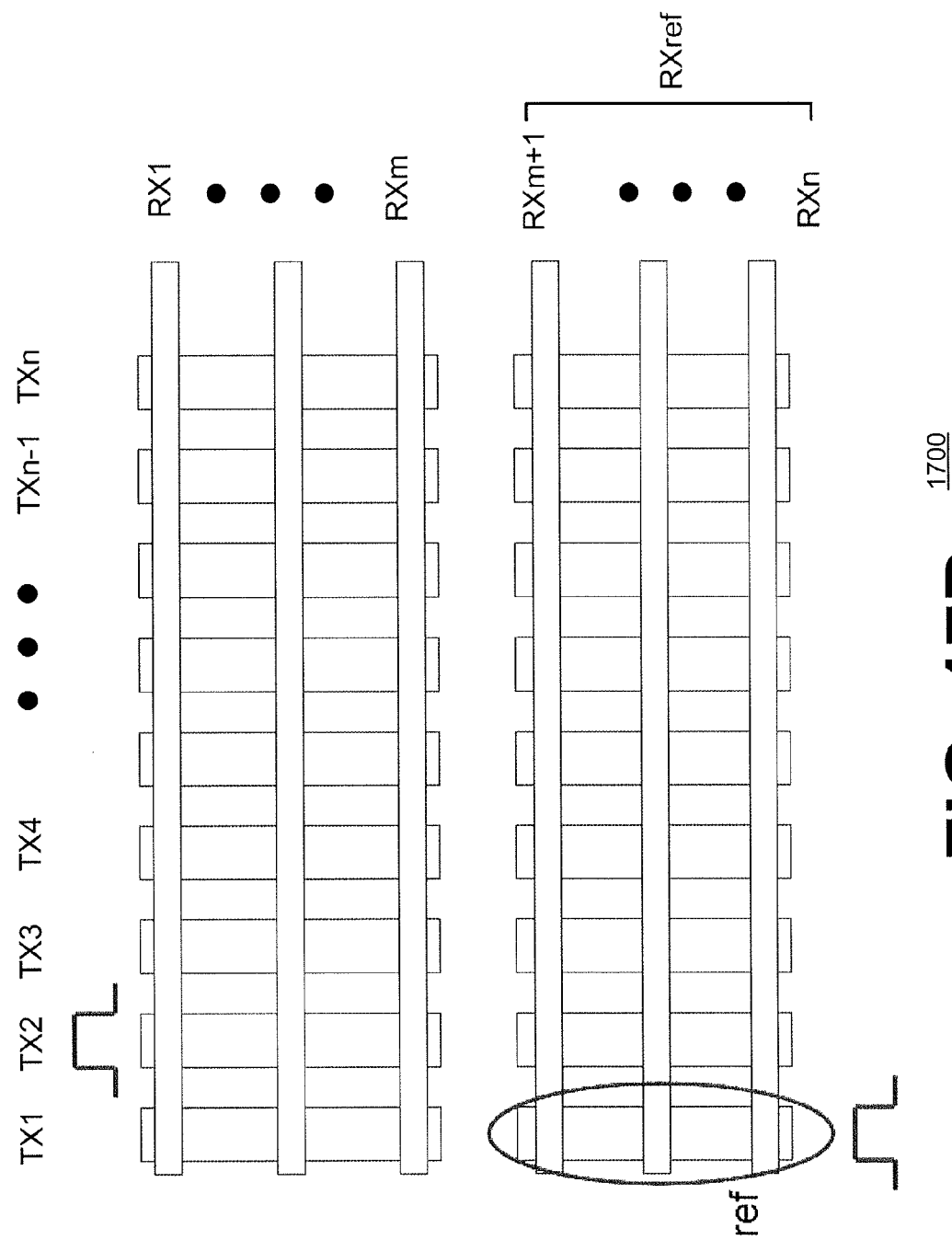
Figure 17C:
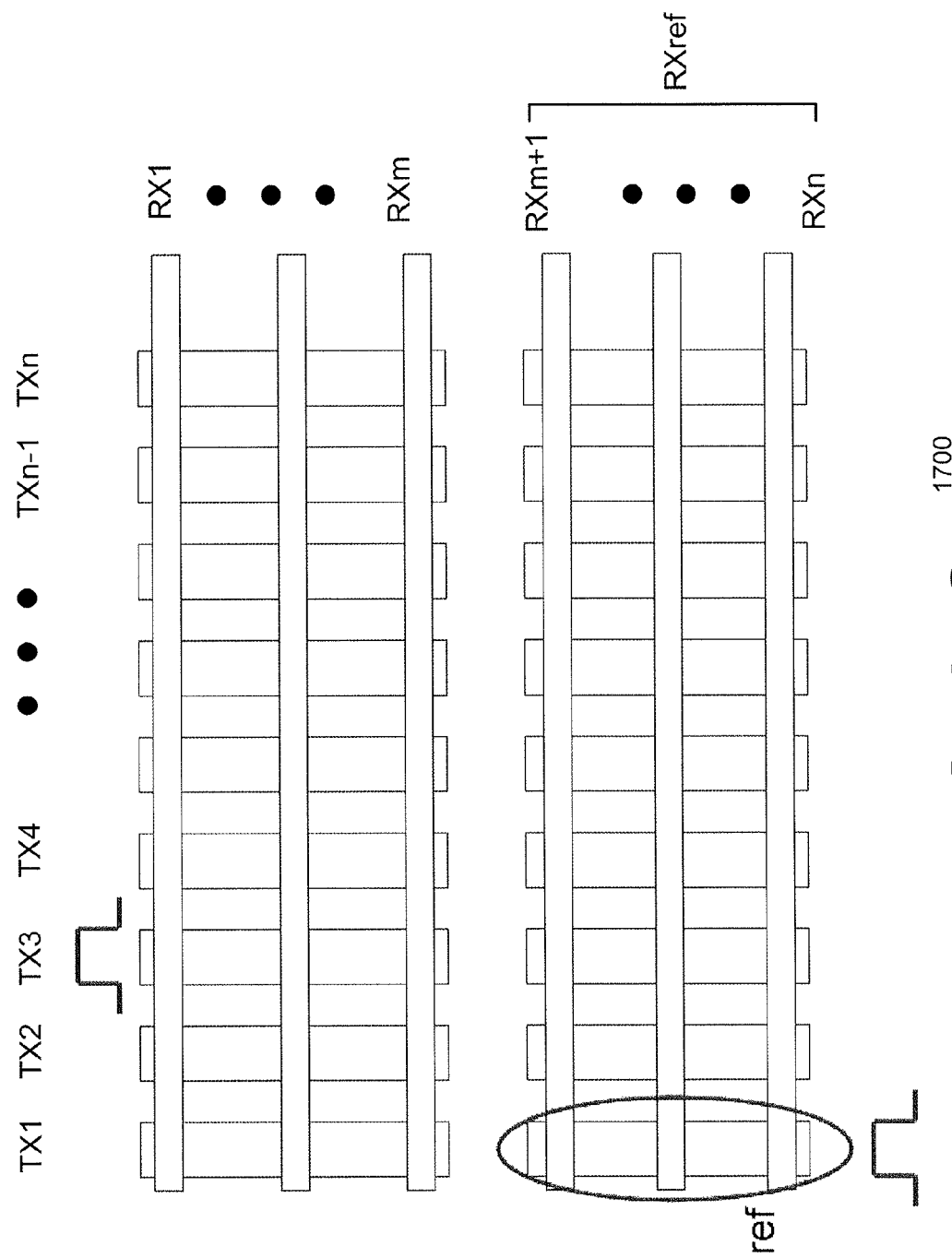

FIGS. 17A-C are schematic diagrams of an array 1700 of receiver and transmission lines for a processing system for an input device in another exemplary embodiment utilizing split-drive differential sensing showing an exemplary way of operating the array to obtain readings for the top half of the array. Similar to the exemplary embodiment shown in FIG. 9A, a single second portion of a first transmitter electrode (TX1) in the bottom half of the array is used as a reference. This single second portion of the first transmitter electrode (TX1) is driven with a reference transmitter signal, which allows resulting reference signals to be obtained via the corresponding receiver electrodes. Additionally, the resulting reference signals from multiple reference receiver lines may be connected together to provide an averaged reference taking into account the readings from multiple receiver electrodes.

FIG. 17A illustrates the first portion of the first transmitter electrode (TX1) being driven such that resulting signals for pixels corresponding to the first portion of the first transmitter electrode (TX1) can be obtained. FIG. 17B illustrates the first portion of a second transmitter electrode (TX2) being driven such that resulting signals for pixels corresponding to the first portion of the second transmitter electrode (TX2) can be obtained. FIG. 17C illustrates the first portion of a third transmitter electrode (TX3) being driven such that resulting signals for pixels corresponding to the first portion of the third transmitter electrode (TX3) can be obtained. It can also be seen from FIGS. 17A-17C that the second portion of the first transmitter electrode (TX1) is driven with reference transmitter signals so as to provide consistent resulting reference signals with respect to all of the pixels corresponding to the first portions of the transmitter electrodes that are being read (i.e., the pixels of the top portion of the array).

Figure 18A:
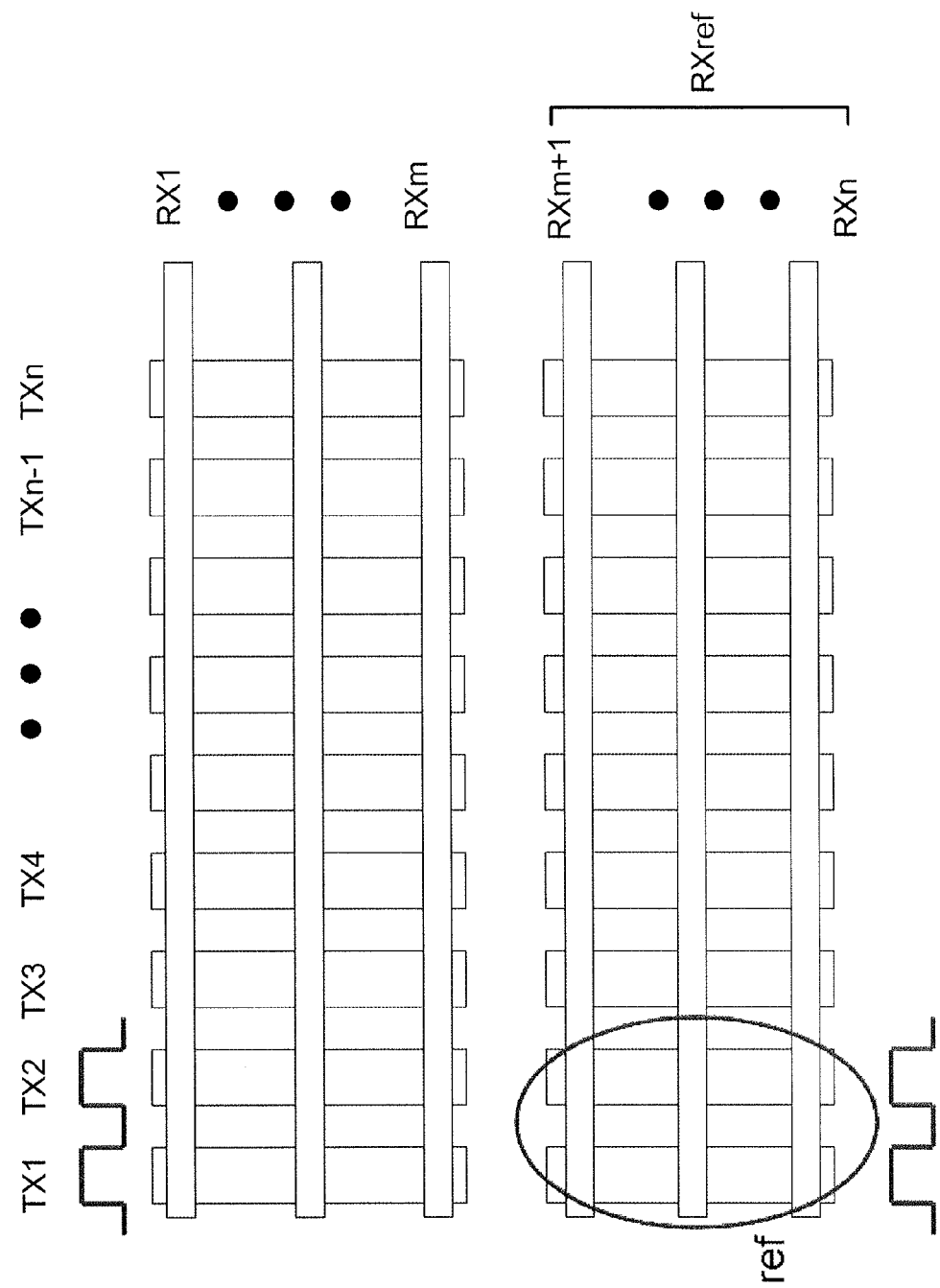
FIGS. 18A-C are schematic diagrams of the array depicted in FIGS. 17A-C showing another exemplary way of operating the array to obtain readings for the top half of the array.
Figure 18B:
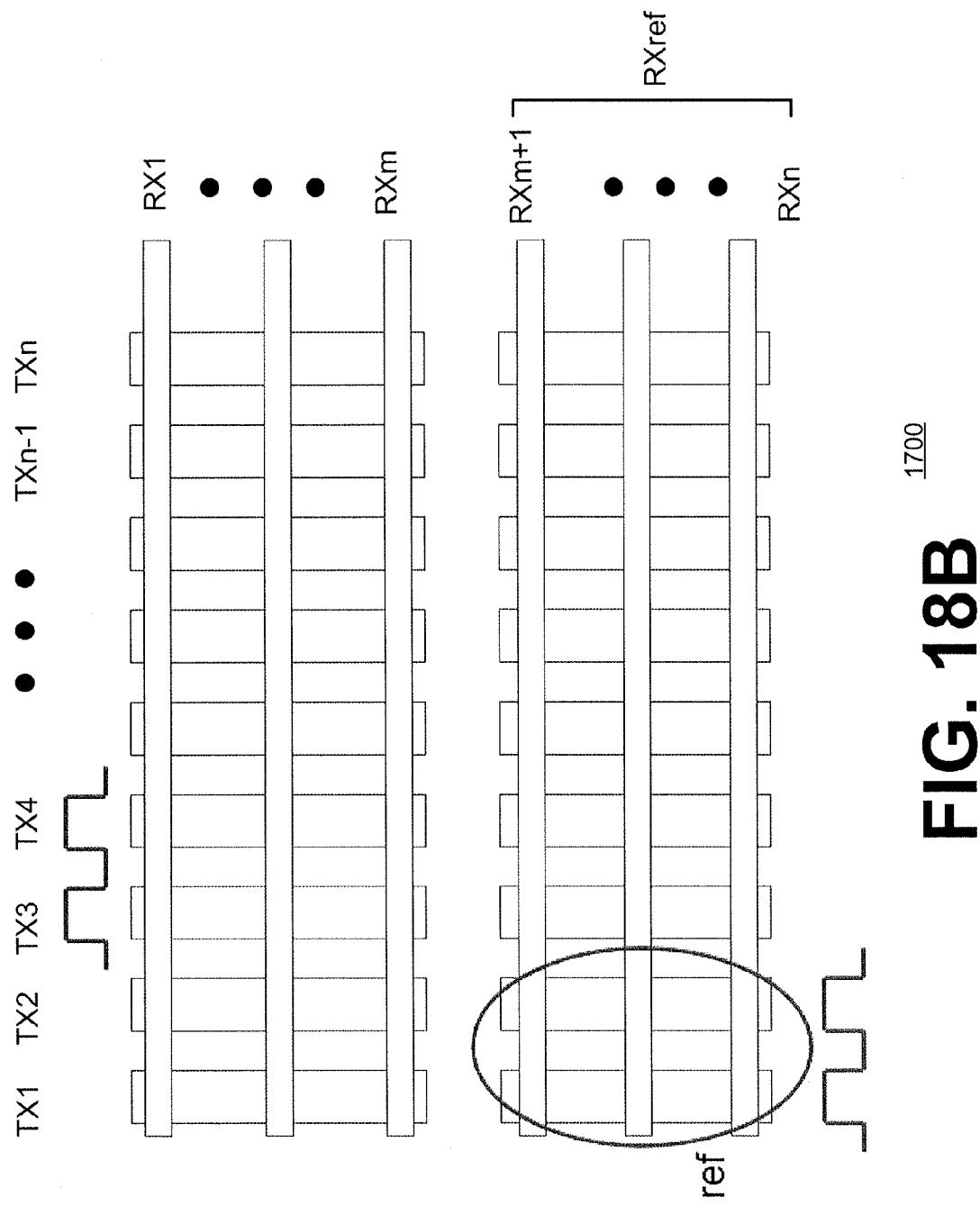
Figure 18C:
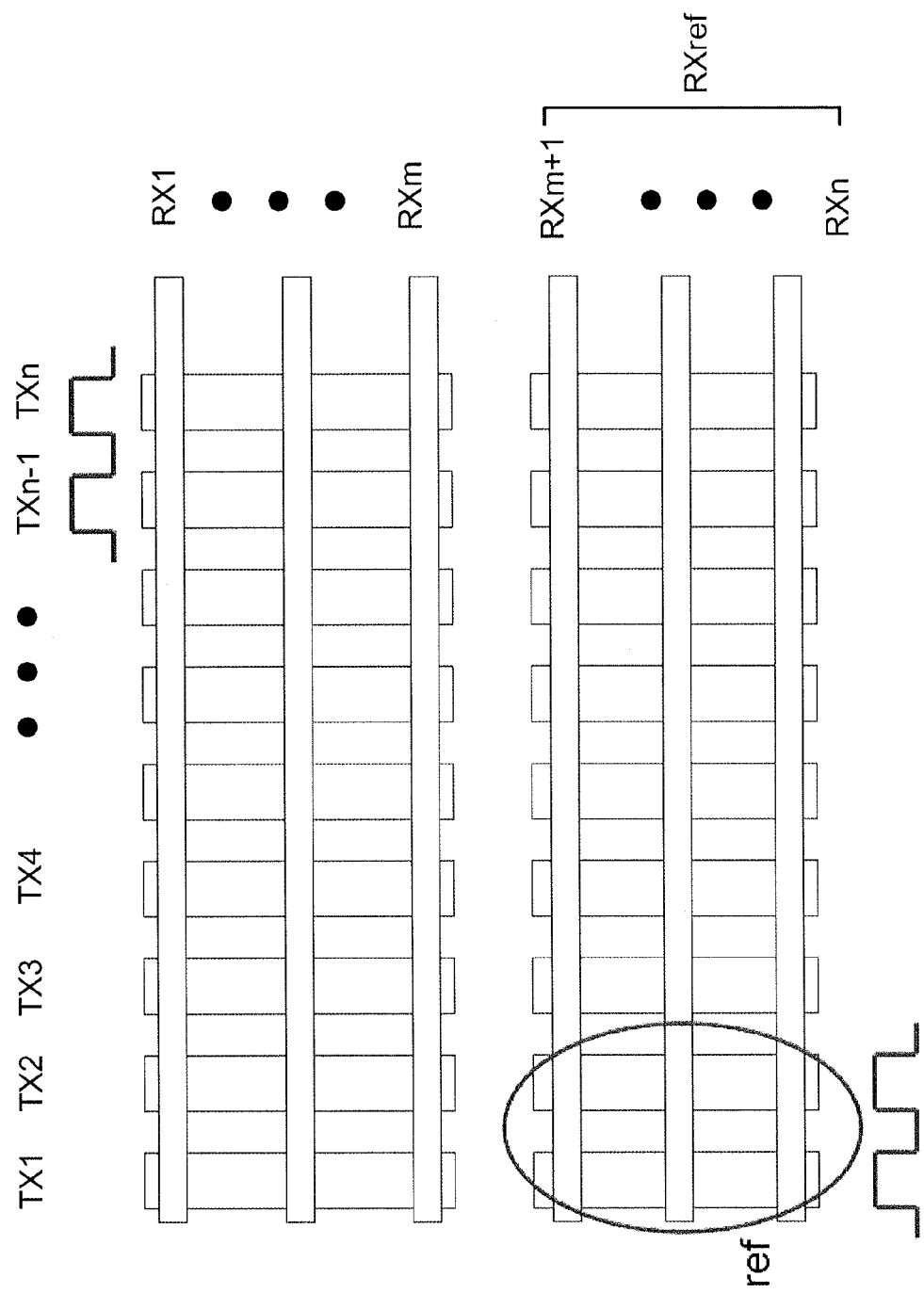

FIGS. 18A-C are schematic diagrams of the array 1700 showing another exemplary way of operating the array to obtain readings for the top half of the array. In FIGS. 18A-C, second portions of two transmitter electrodes (TX1 and TX2) are both driven with reference transmitter signals, and two first portions of two transmitter electrodes are driven with transmitter signals to allow for resulting signals to be obtained simultaneously for pixels corresponding to the two first portions of the two transmitter electrodes. Additionally, the resulting reference signals from multiple reference receiver lines may be connected together to provide an averaged reference taking into account the readings from multiple receiver electrodes.

FIG. 18A illustrates the first portions of the first and second transmitter electrodes (TX1 and TX2) being driven such that resulting signals for pixels corresponding to the first portions of the first and second transmitter electrodes (TX1 and TX2) can be obtained. FIG. 18B illustrates the first portions of third and fourth transmitter electrodes (TX3 and TX4) being driven such that resulting signals for pixels corresponding to the first portions of third and fourth transmitter electrodes (TX3 and TX4) can be obtained. FIG. 18C illustrates the first portions of (n−1)th and nth transmitter electrodes (TXn−1 and TXn) being driven such that resulting signals for pixels corresponding to the first portions of (n−1)th and nth transmitter electrodes (TXn−1 and TXn) can be obtained. It can also be seen from FIGS. 18A-C that the second portions of the first and second transmitter electrodes (TX1 and TX2) are driven with reference transmitter signals so as to provide consistent resulting reference signals with respect to all of the pixels corresponding to the first portions of the transmitter electrodes that are being read (i.e., the pixels of the top portion of the array).

In other exemplary embodiments, the array 1700 is operated with three or more second portions of the transmitter electrodes being driven with reference transmitter signals to provide a consistent reference, with a corresponding amount of first portions of the transmitter electrodes being driven with transmitter signals to provide resulting signals for the corresponding pixels. In these exemplary embodiments, the transmitter electrode portions in the part of the array being used for reference is fixed regardless of which transmitter electrode portions in the part of the array being read are driven. Additionally, the number of transmitter electrode portions being driven for reference is preferably equal to the number of transmitter electrode portions being driven to provide pixel readings. This provides a similar signal level going into each input of the differential amplifier(s), such that the delta between the inputs (corresponding to fingerprint information) is small, and a high gain can be applied to the delta.

In further exemplary embodiments, the array 1700 is driven using coded phase or CDM techniques. Similar to the embodiments discussed above with respect to FIG. 16, the phases associated with the transmitter signals driving the part of the array 1700 being read go through a sequence of different phase configurations, while the phase configuration and the driving configuration for the part of the array 1700 being used as the reference remains fixed. Additionally, in certain embodiments, the total phase summation for the first portions of the transmitter electrodes being read equals the total phase summation for the second portions of the transmitter electrodes being used as the reference.

Figure 19:
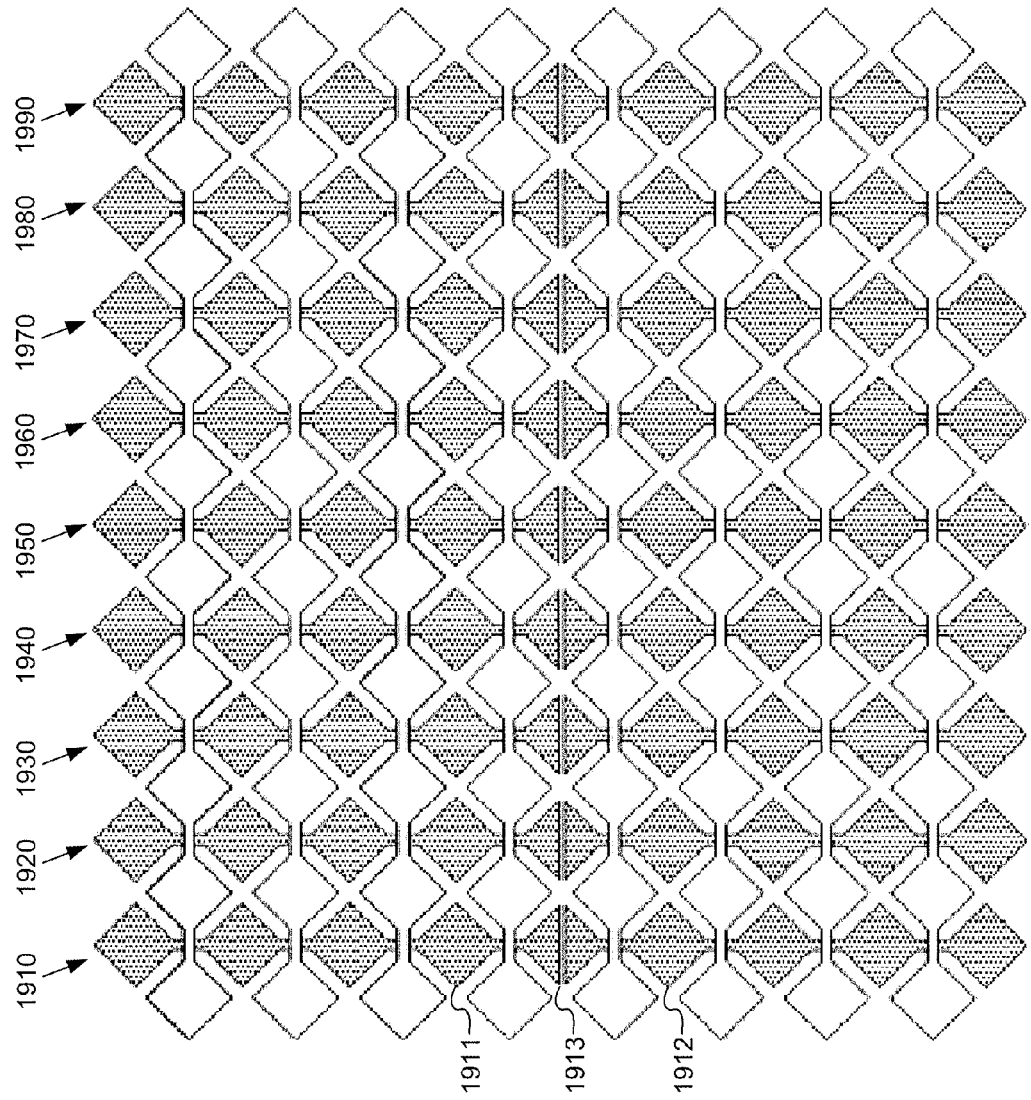
FIG. 19 illustrates an exemplary electrode configuration having electrodes with diamond patterns.

It will be appreciated that, although exemplary embodiments discussed herein depict rectangular transmitter and receiver electrodes arranged in a grid pattern, the principles discussed herein with respect to split-drive sensing techniques may also be utilized with other electrode configurations as well. One example is depicted in FIG. 19. FIG. 19 illustrates an exemplary electrode configuration 1900 having electrodes with "diamond" patterns, with a plurality of transmitter electrodes 1910, 1920, 1930, 1940, 1950, 1960, 1970, 1980, 1990, each transmitter electrode being separated into first and second portions (e.g., first portion 1911 of transmitter electrode 1910 and second portion 1912 of transmitter electrode 1910) that are divided by respective separations (e.g., the separation 1913 between first portion 1911 and second portion 1912). In this exemplary configuration, the receiver electrodes forming the receiver lines, which overlap the transmitter electrodes, also have diamond patterns, as depicted in FIG. 19. In the exemplary configuration 1900 depicted in FIG. 19, the separation is positioned such that it bisects diamond patterns in the transmitter electrodes. This positioning of the separation can minimize any signal loss at pixels near the separation portion. In other exemplary implementations relating to electrodes having diamond patterns, the separation may be positioned at a different location (e.g., higher or lower in the relatively wide parts of the transmitter electrodes) and/or have a different shape (e.g., similar to the different separation patterns discussed above with respect to FIGS. 16-17).

The use of the terms "a" and "an" and "the" and "at least one" and similar referents in the context of the description and the claims are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Variations of the exemplary embodiments discussed herein may become apparent to those of ordinary skill in the art upon reading the foregoing description. The inventors expect skilled artisans to employ such variations as appropriate, and the inventors intend for the principles described herein to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A device for capacitive sensing, comprising:
 a plurality of sensor electrodes, the plurality of sensor electrodes comprising: a plurality of receiver electrodes and a plurality of transmitter electrodes, wherein a transmitter electrode of the plurality of transmitter electrodes comprises a first portion and a second portion with a separation between the first portion and the second portion; and a processing system, configured to:
drive the first portion of the transmitter electrode with a transmitter signal,
receive a resulting signal corresponding to the first portion of the transmitter electrode via a first receiver electrode of the plurality of receiver electrodes,
receive a reference signal corresponding to the second portion of the transmitter electrode via a second receiver electrode of the plurality of receiver electrodes, and
determine a modified resulting signal based on the resulting signal and the reference signal.

2. The device according to claim 1, wherein the plurality of receiver electrodes and the plurality of transmitter electrodes are arranged in a grid such that the plurality of receiver electrodes and the plurality of transmitter electrodes are orthogonal to each other.

3. The device according to claim 1, wherein the separation between the first portion and the second portion of the transmitter electrode is disposed between two adjacent receiver electrodes of the plurality of receiver electrodes.

4. The device according to claim 1, wherein the separation between the first portion and the second portion of the transmitter electrode is configured such that the first portion and the second portion of the transmitter electrode form an interdigitated pattern.

5. The device according to claim 4, wherein the separation between the first portion and the second portion of the transmitter electrode overlaps with two adjacent receiver electrodes of the plurality of receiver electrodes.

6. The device according to claim 1, wherein the separation between the first and the second portion of the transmitter electrode comprises a triangular pattern.

7. The device according to claim 1, wherein the reference signal corresponding to the second portion of the transmitter electrode corresponds to the second portion of the transmitter electrode being held at a fixed voltage.

8. The device according to claim 1, wherein each of the plurality of transmitter electrodes comprises a first portion and a second portion;
wherein the processing system is further configured to drive the first portions of the plurality of transmitter electrodes according to a sequence while driving at least one of the second portions of the plurality of transmitter electrodes with a reference transmitter signal.

9. The device according to claim 8, wherein the sequence comprises multiple steps;
wherein in each step of the multiple steps, multiple first portions of the plurality of transmitter electrodes are driven simultaneously with coded phases corresponding to the step and reference transmitter signals are applied to one or more second portions of the plurality of transmitter electrodes; and
wherein for each step of the multiple steps a summation of phases of the multiple first portions of the plurality of transmitter electrodes is equal to a summation of phases of the one or more second portions of the plurality of transmitter electrodes.

10. The device according to claim 8, wherein the processing system is further configured to simultaneously drive an equal number of the first portions and the second portions.

11. The device according to claim 8, wherein the sequence comprises multiple steps;
wherein in each step of the multiple steps, the reference transmitter signal used to drive the at least one of the second portions of the plurality of transmitter electrodes remains fixed.

12. The device according to claim 1, wherein the processing system is further configured to receive another reference signal from a third receiver electrode of the plurality of receiver electrodes; and
wherein determining the modified resulting signal is further based on a combination of the reference signal with the another reference signal.

13. The device according to claim 1, wherein the processing system comprises multiple differential amplifiers, wherein each of the multiple differential amplifiers is configured to receive as an input reference signals corresponding to the second portion of the transmitter electrode via multiple receiver electrodes of the plurality of receiver electrodes, wherein the multiple differential amplifiers are equal in number to the multiple receiver electrodes.

14. The input device according to claim 1, wherein the processing system comprises a differential amplifier, wherein the differential amplifier is configured to perform the determination of the modified resulting signal based on a differential of the resulting signal and the reference signal.

15. The device according to claim 1, wherein the plurality of sensor electrodes are configured to detect ridges and valleys of a fingerprint.

16. A processing system for a capacitive sensing device, the processing system comprising a processor and a memory, wherein the processor is configured to:
drive a first portion of a transmitter electrode of the capacitive sensing device with a transmitter signal;
receive a resulting signal corresponding to the first portion of the transmitter electrode via a first receiver electrode of the capacitive sensing device;
receive a reference signal corresponding to a second portion of the transmitter electrode of the capacitive sensing device via a second receiver electrode of the capacitive sensing device, the second portion of the transmitter electrode being separate from the first portion of the transmitter electrode; and
determine a modified resulting signal based on the resulting signal and the reference signal.

17. The processing system according to claim 16, wherein the processor is further configured to drive first portions of a plurality of transmitter electrodes of the capacitive sensing device according to a sequence, and to drive at least one of a plurality of second portions of the plurality of transmitter electrodes of the capacitive sensing device with a reference transmitter signal.

18. A method for capacitive sensing for a capacitive sensing device, the method comprising:
driving, by a processing system of the device, a first portion of a transmitter electrode of the device with a transmitter signal;
receiving, by the processing system, a resulting signal corresponding to the first portion of the transmitter electrode via a first receiver electrode of the device;
receiving, by the processing system, a reference signal corresponding to a second portion of the transmitter electrode of the device via a second receiver electrode of the device, the second portion of the transmitter electrode being separate from the first portion of the transmitter electrode; and determining, by the processing system, a modified resulting signal based on the resulting signal and the reference signal.

19. The method according to claim 18, further comprising:
   driving first portions of a plurality of transmitter electrodes of the device according to a sequence; and
   driving at least one of a plurality of second portions of the plurality of transmitter electrodes of the device with a reference transmitter signal.

20. The method according to claim 18, further comprising:
   receiving another reference signal from a third receiver electrode;
   wherein determining the modified resulting signal is further based on a combination of the reference signal with the another reference signal.

* * * * *